(12) United States Patent
Moriyasu et al.

(10) Patent No.: US 10,131,778 B2
(45) Date of Patent: Nov. 20, 2018

(54) ETHYLENE VINYL ACETATE COPOLYMER RESIN COMPOSITION, GRAFT COPOLYMER, THERMOPLASTIC RESIN COMPOSITION, AND MOLDED RESIN ARTICLE

(71) Applicant: NOF CORPORATION, Tokyo (JP)

(72) Inventors: Shingo Moriyasu, Aichi (JP); Tomohisa Tasaka, Aichi (JP); Kazuaki Mima, Aichi (JP)

(73) Assignee: NOF CORPORATION, Tokyo (JP)

( * ) Notice: Subject to any disclaimer, the term of this patent is extended or adjusted under 35 U.S.C. 154(b) by 0 days.

(21) Appl. No.: 15/527,346

(22) PCT Filed: Nov. 13, 2015

(86) PCT No.: PCT/JP2015/081937
§ 371 (c)(1),
(2) Date: May 17, 2017

(87) PCT Pub. No.: WO2016/080298
PCT Pub. Date: May 26, 2016

(65) Prior Publication Data
US 2017/0321052 A1    Nov. 9, 2017

(30) Foreign Application Priority Data

Sep. 29, 2015 (JP) ................................. 2015-190772

(51) Int. Cl.
| | | |
|---|---|---|
| *C08L 51/06* | (2006.01) | |
| *C08F 255/02* | (2006.01) | |
| *C08L 59/00* | (2006.01) | |

(52) U.S. Cl.
CPC ............ *C08L 51/06* (2013.01); *C08F 255/02* (2013.01); *C08L 59/00* (2013.01)

(58) Field of Classification Search
CPC ......... C08F 255/02; C08L 51/06; C08L 59/00
See application file for complete search history.

(56) References Cited

U.S. PATENT DOCUMENTS

| | | | | |
|---|---|---|---|---|
| 4,753,990 A | * | 6/1988 | Moriya ................ | C08G 81/021 525/277 |
| 4,839,432 A | * | 6/1989 | Moriya ................ | C08F 255/02 525/243 |
| 4,877,841 A | * | 10/1989 | Moriya .................... | C08F 4/34 525/263 |
| 5,314,912 A | * | 5/1994 | Yoshitani .............. | C08F 255/00 524/458 |
| 2005/0288434 A1 | * | 12/2005 | Sugiura ................. | C08F 285/00 525/70 |

FOREIGN PATENT DOCUMENTS

| | | |
|---|---|---|
| JP | 1-131220 A | 5/1989 |
| JP | 1-138214 A | 5/1989 |
| JP | 03-217425 A | 9/1991 |
| JP | 04-033948 A | 2/1992 |
| JP | 04-120159 A | 4/1992 |
| JP | 4-211447 A | 8/1992 |
| JP | 5-093129 A | 4/1993 |
| JP | 06-100799 A | 4/1994 |
| JP | 7-003108 A | 1/1995 |
| JP | 08-225778 A | 9/1996 |
| JP | 08-259766 A | 10/1996 |
| JP | 2002-201331 A | 7/2002 |

OTHER PUBLICATIONS

International Search Report for PCT/JP2015/081937, dated Feb. 9, 2016.

\* cited by examiner

*Primary Examiner* — Mark S Kaucher
(74) *Attorney, Agent, or Firm* — Sughrue Mion, PLLC

(57) ABSTRACT

An ethylene-vinyl acetate copolymer resin composition includes: an (A) ethylene-vinyl acetate copolymer; a (B) vinyl copolymer; and a (C) organic peroxide. The (B) vinyl copolymer and the (C) organic peroxide are impregnated in the (A) ethylene-vinyl acetate copolymer. The (A) ethylene-vinyl acetate copolymer includes 1 to 20 wt % of a vinyl acetate. The (B) vinyl copolymer is formed of a (b-1) styrene, (b-2) at least one of acrylonitrile and glycidyl methacrylate, a (b-3) t-butylperoxymethacryloyloxyethyl carbonate, and a (b-4) polymerization initiator. A content of the (C) organic peroxide is 0.1 to 3 parts by weight relative to 100 parts by weight of the (A) ethylene-vinyl acetate copolymer.

8 Claims, No Drawings

ETHYLENE VINYL ACETATE COPOLYMER RESIN COMPOSITION, GRAFT COPOLYMER, THERMOPLASTIC RESIN COMPOSITION, AND MOLDED RESIN ARTICLE

CROSS REFERENCE TO RELATED APPLICATIONS

This Application is a National Stage of International Application No. PCT/JP2015/081937 filed Nov. 13, 2015, claiming priority based on Japanese Patent Application No. 2014-233299 filed Nov. 18, 2014, Japanese Patent Application No. 2015-095367 filed May 8, 2015, Japanese Patent Application No. 2015-135054 filed Jul. 6, 2015, Japanese Patent Application No. 2015-135056 filed Jul. 6, 2015 and Japanese Patent Application No. 2015-190772 filed Sep. 29, 2015, the contents of all of which are incorporated herein by reference in their entirety.

TECHNICAL FIELD

The present invention relates to an ethylene vinyl acetate copolymer resin composition, a graft copolymer, a thermoplastic resin composition, and a molded resin article.

BACKGROUND ART

A thermoplastic resin is classified into a crystalline thermoplastic resin and an amorphous thermoplastic resin. A crystalline thermoplastic resin such as polyacetal and polyamide has not only excellent mechanical properties, heat resistance, electrical properties, and formability but also excellent sliding properties. Therefore, the crystalline thermoplastic resin is used in various fields as a sliding member such as a bearing and a gear.

However, in recent years, a high demand is being made for the sliding member along with development of the above-mentioned fields. In particular, sliding properties such as a friction coefficient, a wear amount, and sliding sound (squeaking sound) of the sliding member is desired to be further improved.

Meanwhile, an amorphous thermoplastic resin such as a polycarbonate resin and an acrylonitrile-butadiene-styrene copolymer (ABS) resin has an excellent heat resistance, resistance to shock, and dimensional stability. For that reason, the amorphous thermoplastic resin is used as a material of various parts of OA equipment or the like in an electrical and electronic field or an automobile field. However, the sliding properties of the amorphous thermoplastic resin are less than those of the crystalline thermoplastic resin. In this regard, attempts are being made to add or select an improving agent for giving a function of sliding properties or wear resistance to an amorphous thermoplastic resin having excellent dimensional stability.

A general technique for improving the sliding properties of a thermoplastic resin is disclosed in Patent Literature 1 to Patent Literature 4.

In the technique described in Patent Literature 1, a graft copolymer containing polyethylene or an ethylene-glycidyl methacrylate copolymer and acrylonitrile-styrene copolymer or polystyrene is used as an additive. In the technique described in Patent Literature 2, a multi-phase structure resin formed of an olefin-based copolymer and a vinyl-based copolymer is used as an additive.

In Patent Literature 3, a technology in which a hard coating layer is formed by coating and curing an ultraviolet curing acrylic hard coating agent on a surface of a finally-molded thermoplastic resin is disclosed.

Further, in Patent Literature 4, a technology in which a fluorine/silicone-based coating composition as a surface processing agent is coated on a surface of an ABS resin in order to suppress or reduce squeaking sound is disclosed.

CITATION LIST

Patent Literature

Patent Literature 1: Japanese Patent Application Laid-open No. 1996-259766
Patent Literature 2: Japanese Patent Application Laid-open No. 1992-120159
Patent Literature 3: Japanese Patent Application Laid-open No. 1994-100799
Patent Literature 4: Japanese Patent Application Laid-open No. 1991-217425

SUMMARY OF INVENTION

Problem to be Solved by the Invention

However, in the thermoplastic resin composition obtained by mixing the above-mentioned mixture in a thermoplastic resin, although sufficient sliding properties are achieved in a sliding test in which a mate material is formed of metal, sufficient sliding properties are not achieved in a sliding test in which the mate material is a resin to which not additive is added or a sliding test in which the mate material is the thermoplastic resin composition. Further, in the thermoplastic resin composition, sufficient sliding properties are not achieved even in a sliding test in a large burden. Furthermore, squeaking sound cannot be sufficiently improved.

Further, in the technique described in Patent Literature 3 or Patent Literature 4, there is a need to perform a coating step, which increases the work time or cost burden. In this regard, if the sliding properties of the thermoplastic resin composition itself can be improved, excellent sliding properties can be achieved without performing the coating step.

In view of the circumstances as described above, it is an object of the present invention to provide a technique for reducing squeaking sound and improving sliding properties with respect to a thermoplastic resin while maintaining the mechanical properties of the thermoplastic resin.

Means for Solving the Problem

In order to achieve the above-mentioned object, an ethylene-vinyl acetate copolymer resin composition according to an embodiment of the present invention includes an (A) ethylene-vinyl acetate copolymer; a (B) vinyl copolymer; and a (C) organic peroxide.

The (B) vinyl copolymer and the (C) organic peroxide are impregnated in the (A) ethylene-vinyl acetate copolymer.

The (A) ethylene-vinyl acetate copolymer includes 1 to 20 wt % of a vinyl acetate.

The (B) vinyl copolymer is formed of a (b-1) styrene, (b-2) at least one of acrylonitrile and glycidyl methacrylate, a (b-3) t-butylperoxymethacryloyloxyethyl carbonate, and a (b-4) polymerization initiator.

A content of the (C) organic peroxide is 0.1 to 3 parts by weight relative to 100 parts by weight of the (A) ethylene-vinyl acetate copolymer.

By adding the ethylene-vinyl acetate copolymer resin composition having this configuration to a thermoplastic resin, a thermoplastic resin composition having excellent mechanical properties and sliding properties and reduced squeaking sound is obtained.

A content of the (A) ethylene-vinyl acetate copolymer may be 50 to 90 parts by weight relative to 100 parts by weight of the (A) ethylene-vinyl acetate copolymer, the (b-1) styrene, and the (b-2) at least one of acrylonitrile and glycidyl methacrylate.

By using the ethylene-vinyl acetate copolymer resin composition having this configuration, it is possible to obtain a thermoplastic resin composition having excellent sliding properties.

A 10 hour half-life period temperature of the (b-4) polymerization initiator may be 50 to 75° C.

A 10 hour half-life period temperature of the (C) organic peroxide may be 95 to 130° C.

In this configuration, the 10 hour half-life period temperature of the (C) organic peroxide is higher than that of the (b-4) polymerization initiator. Therefore, at the time of the polymerization reaction for obtaining the (B) vinyl copolymer, the (C) organic peroxide is unlikely to be decomposed. Therefore, because the (C) organic peroxide is unlikely to be reduced in the ethylene-vinyl acetate copolymer resin composition having this configuration, it is possible to prevent a cross-linking reaction of the (A) ethylene vinyl acetate copolymer from being insufficient at the time of melt-kneading.

A graft copolymer according to an embodiment of the present invention is obtained by melt-kneading the ethylene-vinyl acetate copolymer resin composition.

A main chain of the graft copolymer is formed of the (A) ethylene-vinyl acetate copolymer.

A side chain of the graft copolymer is formed of a vinyl copolymer including the (b-1) styrene and the (b-2) at least one of acrylonitrile and glycidyl methacrylate.

By adding the graft copolymer having this configuration, it is possible to obtain a thermoplastic resin composition having excellent mechanical properties and sliding properties.

A graft copolymer according to an embodiment of the present invention includes a (X) thermoplastic resin; and the (Y) graft copolymer.

A content of the (Y) graft copolymer is 1 to 25 parts by weight relative to 100 parts by weight of the (X) thermoplastic resin.

With this configuration, it is possible to provide a thermoplastic resin composition having further excellent mechanical properties and sliding properties.

A thermoplastic resin composition according to an embodiment of the present invention is a mixture of one or two or more kinds of resin selected from a polyacetal resin, a polyamide resin, a polycarbonate resin, and an ABS resin.

With this configuration, it is possible to provide a thermoplastic resin composition having further excellent mechanical properties and sliding properties.

A thermoplastic resin composition according to an embodiment of the present invention further including one or more kinds of lubricant selected from a fatty acid ester, a fatty acid amide, a polyethylene wax, and a paraffin wax as a (Z-1) lubricant.

A content of the (Z-1) lubricant is 1 to 5 parts by weight relative to 100 parts by weight of the (X) thermoplastic resin.

With this configuration, it is possible to provide a thermoplastic resin composition having further excellent mechanical properties and sliding properties.

A thermoplastic resin composition according to an embodiment of the present invention further including one or more kinds of filler selected from calcium carbonate and potassium titanate as a (Z-2) inorganic filler.

A content of the (Z-2) inorganic filler is 3 to 8 parts by weight relative to 100 parts by weight of the (X) thermoplastic resin.

With this configuration, it is possible to provide a thermoplastic resin composition having further excellent mechanical properties and sliding properties.

A molded resin article according to an embodiment of the present invention is obtained by molding the thermoplastic resin composition.

Advantageous Effects of Invention

It is possible to provide a technique for reducing squeaking sound and improving sliding properties with respect to a thermoplastic resin while maintaining the mechanical properties of the thermoplastic resin.

Mode(s) for Carrying Out the Invention

Hereinafter, an embodiment of the present invention will be described.

<Overview>

In this embodiment, by mixing a (Y) graft copolymer including a particular main chain and a particular side chain, which is obtained by selectively crosslinking the main chain by organic peroxide, in a (X) thermoplastic resin, a thermoplastic resin composition in which the (Y) graft copolymer is favorably dispersed in the (X) thermoplastic resin is generated.

In the thermoplastic resin composition according to this embodiment, original excellent mechanical properties of the thermoplastic resin are maintained, and excellent sliding properties are achieved regardless of the kind of a mate material or the magnitude of a burden. This thermoplastic resin composition can be used as, for example, an electrical part, an electronic part, a machine part, a precision equipment part, or an automobile part, in various fields.

The (Y) graft copolymer according to this embodiment can be obtained by melt-kneading the ethylene-vinyl acetate copolymer resin composition described below.

<Ethylene-Vinyl Acetate Copolymer Resin Composition>

An ethylene-vinyl acetate copolymer resin composition according to this embodiment includes an (A) ethylene-vinyl acetate copolymer (EVA), a (B) vinyl copolymer, and a (C) organic peroxide. The (B) vinyl copolymer and the (C) organic peroxide are impregnated in the (A) ethylene-vinyl acetate copolymer.

[(A) Ethylene-Vinyl Acetate Copolymer (EVA)]

The content of a vinyl acetate in a structural unit of the (A) ethylene-vinyl acetate copolymer according to this embodiment is favorably 1 to 20 wt %, and more favorably, 3 to 10 wt %.

Sliding properties of the thermoplastic resin composition are improved by keeping the content of a vinyl acetate not more than 20 wt % in the (A) ethylene-vinyl acetate copolymer, and sliding properties of the thermoplastic resin composition are further improved by keeping the content of a vinyl acetate not more than 10 wt %. Furthermore, in these cases, the heat resistance of the (Y) graft copolymer is improved.

Meanwhile, a crosslinking reaction by the (C) organic peroxide is likely to proceed by keeping the content of a vinyl acetate not less than 1 wt % in the (A) ethylene-vinyl acetate copolymer, and a crosslinking reaction by the (C) organic peroxide is further likely to proceed by keeping the content of a vinyl acetate in the (A) ethylene-vinyl acetate copolymer not less than 3 wt %.

Further, as the (A) ethylene-vinyl acetate copolymer, any of those having fluidity can be selected. However, the melt flow rate (MFR) of the (A) ethylene-vinyl acetate copolymer is favorably 0.1 to 25 (g/10 min) at 190° C. and more favorably, 1.0 to 10 (g/10 min) in a measurement method conforming to JIS K 7210.

Sliding properties of the thermoplastic resin composition are improved by keeping the MFR not more than 25 (g/10 min), and further, not more than 10 (g/10 min), in the (A) ethylene-vinyl acetate copolymer. Meanwhile, workability in the process for manufacturing the (Y) graft copolymer is improved by making the MFR not less than 0.1 (g/10 min), and further, not less than 1.0 (g/10 min) in the (A) ethylene-vinyl acetate copolymer.

[(B) Vinyl Copolymer]

The (B) vinyl copolymer according to this embodiment is formed of a vinyl monomer composition including a (b-1) styrene, (b-2) at least one of acrylonitrile and glycidyl methacrylate, a (b-3) t-butylperoxymethacryloyloxyethyl carbonate, and a (b-4) polymerization initiator.

The content of each of the monomers (b-1), (b-2), (b-3), and (b-4) in the (B) vinyl copolymer can be appropriately determined. However, the content of the (b-1) styrene is favorably 50 to 99 parts by weight relative to 100 parts by weight of the (b-1) styrene and the (b-2) at least one of acrylonitrile and glycidyl methacrylate. Accordingly, a thermoplastic resin composition having particularly excellent sliding properties and mechanical properties is obtained.

Further, the content of the (A) ethylene-vinyl acetate copolymer is favorably 50 to 90 parts by weight relative to 100 parts by weight of the (A) ethylene-vinyl acetate copolymer, the (b-1) styrene, and the (b-2) at least one of acrylonitrile and glycidyl methacrylate. In this case, particularly excellent sliding properties of a thermoplastic resin composition are achieved.

The (b-3) t-butylperoxymethacryloyloxyethyl carbonate in the (B) vinyl copolymer is a compound represented by the following chemical formula (1). When the ethylene-vinyl acetate copolymer resin composition according to this embodiment is melt-kneaded, a peroxy bond of the (b-3) t-butylperoxymethacryloyloxyethyl carbonate is thermally decomposed to generate a radical. Thus, the (Y) graft copolymer is obtained.

[Chem. 1]

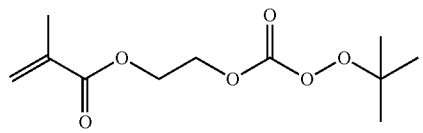

(1)

The (b-4) polymerization initiator in the (B) vinyl copolymer is not limited to a particular kind of an initiator, and a known initiator such as an organic peroxide and an azo initiator can be used. However, the 10 hour half-life period temperature of the (b-4) polymerization initiator is favorably 50 to 75° C.

Note that 10 hour half-life period temperature (hereinafter, an abbreviation thereof, "T10", is also used) is a temperature at which the half-life period of the (b-4) polymerization initiator or the (C) organic peroxide is 10 hours when the solution obtained by dissolving the (b-4) polymerization initiator or the (C) organic peroxide in benzene is thermally decomposed so that the concentration of a peroxy bond or azo bond in the (b-4) polymerization initiator or the (C) organic peroxide is 0.1 mol/liter.

By making the 10 hour half-life period temperature of the (b-4) polymerization initiator not less than 50° C., rapid decomposition of the (b-4) polymerization initiator is suppressed and the polymerization temperature is likely to be controlled. Meanwhile, by making the 10 hour half-life period temperature of the (b-4) polymerization initiator not more than 75° C., the (b-4) polymerization initiator can be favorably decomposed and the (b-4) polymerization initiator itself or another monomer is unlikely to remain in the (Y) graft copolymer.

Note that it is conceivable that the polymerization temperature for obtaining the (B) vinyl copolymer is increased to make the (b-4) polymerization initiator itself or another monomer harder to remain in the (A) ethylene-vinyl acetate copolymer.

However, when the polymerization temperature is increased, the (C) organic peroxide is likely to be decomposed at the time of the polymerization reaction for obtaining the (B) vinyl copolymer because the difference between the polymerization temperature and the 10 hour half-life period temperature of the (C) organic peroxide is small. With this, the (C) organic peroxide is insufficient at the time of melt-kneading and a crosslinking reaction of the (A) ethylene-vinyl acetate copolymer is not sufficiently performed in some cases. Therefore, it is not favorable that the polymerization temperature for obtaining the (B) vinyl copolymer is increased.

Examples of the organic peroxide that can be used as the (b-4) polymerization initiator include the following substances. For each substance, the 10 hour half-life period temperature thereof is shown in the bracket.

t-butyl peroxyneoheptanoate (T10=51° C.)
t-hexyl peroxypivalate (T10=53° C.)
t-butyl peroxypivalate (T10=55° C.)
di(3,5,5-trimethylhexanoyl) peroxide (T10=59° C.)
dilauroyl peroxide (T10=62° C.)
1,1,3,3-tetramethylbutyl peroxy-2-ethylhexanoate (T10=65° C.)
2,5-dimethyl-2,5-di(2-ethylhexanoylperoxy) hexane (T10=66° C.)
t-hexylperoxy-2-ethylhexylhexanoate (T10=70° C.)
di(4-methylbenzoyl) peroxide (T10=71° C.)
t-butylperoxy-2-ethylhexanoate (T10=72° C.)
dibenzoyl peroxide (T10=74° C.)

Examples of the azo compound that can be used as the (b-4) polymerization initiator include the following substances. For each substance, the 10 hour half-life period temperature thereof is shown in the bracket.

2,2-azobis (2,4-dimethylvaleronitrile) (T10=51° C.)
2,2-azobis (isobutyronitrile) (T10=65° C.)
2,2-azobis (2-methylbutyronitrile) (T10=67° C.)

[(C) Organic Peroxide]

The (C) organic peroxide according to this embodiment is capable of crosslinking the (A) ethylene-vinyl acetate copolymer by being thermally decomposed at the time of melt-kneading to generate a radical. The (C) organic peroxide is not limited to a particular kind, and a known one can be used. However, the 10 hour half-life period temperature of the (C) organic peroxide is favorably 95 to 130° C.

By making the 10 hour half-life period temperature of the (C) organic peroxide not less than 95° C., the (C) organic peroxide is unlikely to be decomposed at the time of the polymerization reaction for obtaining the (B) vinyl copolymer. Therefore, it is possible to prevent a crosslinking reaction of the (A) ethylene-vinyl acetate copolymer from being insufficient at the time of melt-kneading because the (C) organic peroxide is unlikely to be reduced at the time of the polymerization reaction for obtaining the (B) vinyl copolymer.

Meanwhile, by making the 10 hour half-life period temperature of the (C) organic peroxide not more than 130° C., the (C) organic peroxide is favorably decomposed at the time of melt-kneading. Accordingly, a crosslinking reaction of the (A) ethylene-vinyl acetate copolymer favorably proceeds.

Examples of the (C) organic peroxide that can be used in this embodiment include the following substances. For each substance, the 10 hour half-life period temperature thereof is shown in the bracket.

t-hexylperoxyisopropyl monocarbonate (T10=95° C.)
t-butylperoxy-3,5,5-trimethylhexanoate (T10=97° C.)
t-butyl peroxylaurate (T10=98° C.)
t-butyl peroxyisopropyl monocarbonate (T10=99° C.)
t-butylperoxy-2-ethylhexyl monocarbonate (T10=99° C.)
t-hexyl peroxybenzoate (T10=99° C.)
2,5-dimethyl-2,5-di(benzoylperoxy) hexane (T10=100° C.)
t-butyl peroxyacetate (T10=102° C.)
2,2-di(t-butylperoxy) butane (T10=103° C.)
t-butyl peroxybenzoate (T10=104° C.)
n-butyl-4,4-di(t-butylperoxy) valerate (T10=105° C.)
di(2-t-butylperoxyisopropyl) benzene (T10=119° C.)
dicumyl peroxide (T10=116° C.)
di-t-hexyl peroxide (T10=116° C.)
2,5-dimethyl-2,5-di(t-butylperoxy) hexane (T10=118° C.)
t-butyl cumyl peroxide (T10=120° C.)
di-t-butyl peroxide (T10=124° C.)

The content of the (C) organic peroxide according to this embodiment is favorably 0.1 to 3 parts by weight relative to 100 parts by weight of the (A) ethylene-vinyl acetate copolymer. By making the content of the (C) organic peroxide not less than 0.1 parts by weight, it is possible to prevent a crosslinking reaction of the (A) ethylene-vinyl acetate copolymer from being insufficient. Meanwhile, by keeping the content of the (C) organic peroxide not more than 3 parts by weight, favorable fluidity is achieved in the (Y) graft copolymer obtained by melt-kneading.

A thermoplastic resin composition according to this embodiment includes the (X) thermoplastic resin and the (Y) graft copolymer.

<(X) Thermoplastic Resin>

The (X) thermoplastic resin that can be used in this embodiment is a thermoplastic resin mixed with one or two or more kinds of resin selected from a polyacetal resin, a polyamide resin, a polycarbonate (PC) resin, and an acrylonitrile-butadiene-styrene copolymer (ABS) resin.

[(X) Polyacetal Resin]

A (X) polyacetal resin can be manufactured by a well-known manufacturing method. As the (X) polyacetal resin, any of a polyacetal homopolymer and a polyacetal copolymer may be used. Further, as a base resin of the (X) polyacetal resin, those modified by crosslinking or performing graft-copolymerization on polyacetal by a well-known method can be used. The degree of polymerization of the (X) polyacetal resin and also the structure of the terminal group are not limited to particular ones.

[(X) Polyamide Resin]

The (X) polyamide resin according to this embodiment is a polymer with a main chain having an amide bond (—NHCO—). The (X) polyamide resin is not limited to a particular kind. Examples of the (X) polyamide resin include polycaprolactam (nylon 6), polytetramethylene adipamide (nylon 46), polyhexamethylene adipamide (nylon 66), polyhexamethylene sebacamide (nylon 610), polyhexamethylene dodecamide (nylon 612), polyundecamethylene adipamide (nylon 116), polyundecalactam (nylon 11), polydodecalactam (nylon 12), polytrimethylhexamethylene terephthalamide (nylon TMHT), polyhexamethylene isophthalamide (nylon 61), polynonanemethylene terephthalamide (9T), polyhexamethylene terephthalamide (6T), polybis (4-aminocyclohexyl) methanedodecamide (nylon PACM12), polybis (3-methyl-aminocyclohexyl) methanedodecamide (nylon dimethyl PACM12), polymethaxylylene adipamide (nylon MXD6), and polyundecamethylene hexahydroterephthalamide (nylon 11T(H)). The (X) polyamide resin may include a single kind or a plurality of kinds.

[(X) Polycarbonate Resin]

A (X) polycarbonate resin according to this embodiment is not limited to a particular kind. For example, an aromatic PC produced by a well-known phosgene method, melting method, or the like is used. The specific manufacturing method is described in Japanese Patent Application Laid-open No. 1988-215763, Japanese Patent Application Laid-open No. 1990-124934, and the like. Examples of typical diphenol used as a raw material include 2,2-bis (4-hydroxyphenyl) propane (so-called bisphenol A). Further, examples of a precursor for introducing carbonate include phosgene and diphenyl carbonate. Any of the manufactured PC resin in which the terminal OH group is sealed and the manufactured PC resin in which the terminal OH group is not sealed can be used.

[(X) ABS Resin]

A (X) ABS resin according to this embodiment includes, as a main component, a copolymer mainly made of three components of acrylonitrile, butadiene, and styrene, and is not limited to a particular kind, and those manufactured by a well-known method can be used as the (X) ABS resin. Examples of the (X) ABS resin include one obtained by performing radical copolymerization on acrylonitrile and styrene under the presence of butadiene. The content of each of acrylonitrile, butadiene, and styrene in the (X) ABS resin is not particularly limited.

[(X) PC/ABS Resin]

Examples of a mixture of two or more kinds of a resin selected from a polyacetal resin, a polyamide resin, a polycarbonate resin, and an ABS resin include a PC/ABS resin.

The (X) PC/ABS resin according to this embodiment is a resin obtained by mixing a (x-1) polycarbonate resin (hereinafter, referred to simply as PC resin in some cases) and a (x-2) acrylonitrile-butadiene-styrene copolymer resin (hereinafter, referred to simply as ABS resin in some cases).

The content of each of the (x-1) PC resin and the (x-2) ABS resin in the (X) PC/ABS resin can be appropriately determined. However, the content of the (x-1) PC resin is favorably 50 to 95 parts by weight relative to 100 parts by weight of the (x-1) PC resin and the (x-2) ABS resin. With this, a PC/ABS resin composition having particularly excellent sliding properties and mechanical properties are obtained.

<(Y) Graft Copolymer>

The (Y) graft copolymer according to this embodiment is obtained by melt-kneading the above-mentioned ethylene-vinyl acetate copolymer resin composition. A uniform graft copolymer is obtained because the (B) vinyl copolymer and the (C) organic peroxide are impregnated in the (A) ethylene-vinyl acetate copolymer in ethylene-vinyl acetate copolymer resin composition.

The main chain of the (Y) graft copolymer is formed of the (A) ethylene-vinyl acetate copolymer. The side chain of the (Y) graft copolymer is formed of a vinyl copolymer including the (b-1) styrene and the (b-2) at least one of acrylonitrile and glycidyl methacrylate.

The content of the (Y) graft copolymer is favorably 1 to 25 parts by weight, and more favorably, 5 to 20 parts by weight relative to 100 parts by weight of the (X) thermoplastic resin.

Sliding properties of a thermoplastic resin composition are improved by making the content of the (Y) graft copolymer not less than 1 parts by weight, and sliding properties of a thermoplastic resin composition are further improved by making the content of the (Y) graft copolymer not less than 5 parts by weight.

Meanwhile, mechanical properties or appearance quality of the thermoplastic resin composition are improved by keeping the content of the (Y) graft copolymer not more than 25 parts by weight, and mechanical properties or appearance quality of the thermoplastic resin composition are further improved by keeping the content of the (Y) graft copolymer not more than 20 parts by weight.

<(Z) Other Additives>

The thermoplastic resin composition according to this embodiment may include an additive other than those described above as necessary. Examples of the additives include lubricants such as mineral oil, hydrocarbons, fatty acids, alcohols, fatty acid esters, fatty acid amides, metal soaps, natural waxes and silicones, inorganic flame retardants such as magnesium hydroxide and aluminum hydroxide, organic flame retardants such as halogene/phosphorous-based retardants, organic or inorganic filler such as calcium carbonate, potassium titanate, metal powder, talc, glass fiber, carbon fiber, and wood powder, additives such as antioxidants, ultraviolet inhibitors, solid lubricants, dispersants, coupling agents, foaming agents, crosslinking agents, and colorants, and other engineering plastics such as polyolefin-based resins, polyesters, and polyphenylene ethers.

[(Z-1) Lubricant]

It is favorable that one or more kinds of lubricant selected from a fatty acid ester, a fatty acid amide, a polyethylene wax, and a paraffin wax is included as the (Z-1) lubricant. Accordingly, sliding properties of the thermoplastic resin composition are further improved.

Furthermore, the content of the above-mentioned (Z-1) lubricant is favorably 1 to 5 parts by weight relative to 100 parts by weight of the (X) thermoplastic resin. Sliding properties of the thermoplastic resin composition are further improved by making the content of the (Z-1) lubricant not less than 1 parts by weight. Further, it is possible to maintain the mechanical strength by making the content of the (Z-1) lubricant not more than 5 parts by weight.

[(Z-2) Inorganic Filler]

It is favorable that one or more kinds of filler selected from calcium carbonate and potassium titanate is included as the (Z-2) inorganic filler. Accordingly, the mechanical strength is further improved.

The content of the above-mentioned (Z-2) inorganic filler is favorably 3 to 8 parts by weight relative to 100 parts by weight of the (X) thermoplastic resin. The mechanical strength is improved by making the content of the (Z-2) inorganic filler not less than 3 parts by weight. Further, sliding properties can be maintained by making the content of the (Z-2) inorganic filler not more than 8 parts by weight.

EXAMPLE

Hereinafter, the present invention will be further specifically described with reference to examples and comparative examples.

1. (Y) Graft Copolymer

[Manufacturing of Ethylene-Vinyl Acetate Copolymer Resin Composition]

In examples 1-1 to 1-13 and comparative examples 1-1 to 1-4, ethylene-vinyl acetate copolymer resin compositions having compositions shown in Table 1 were manufactured. As an example, a manufacturing process for the ethylene-vinyl acetate copolymer resin composition according to the example 1-1 will be described in the following. Note that also the ethylene-vinyl acetate copolymer resin compositions according to other examples and comparative examples were manufactured in a process similar to that in the example 1-1.

[Manufacturing of Ethylene-Vinyl Acetate Copolymer Resin Composition According to Example 1-1]

Two thousand five hundred g of pure water was put in a stainless autoclave with an internal volume of 5 L, and then, 2.5 g of polyvinyl alcohol was dissolved herein as a suspension agent. Seven hundred g of an ethylene vinyl acetate copolymer ("Ultracene 510" (trade name) manufactured by TOSOH corporation, the VAc content of 6%, MFR=2.5 g/10 min) was put therein, and stirred and dispersed.

Separately, a solution obtained by dissolving 4.0 g of a radical polymerization initiator, 9.0 g of a radical (co)polymer organic peroxide, and 3.5 g of a crosslinking agent in 210 g of styrene (St) and 90 g of glycidyl methacrylate (GMA) was generated, and this solution was put in an autoclave and stirred.

Di (3,5,5-trimethylhexanoyl) peroxide ("Peroyl 355" (trade name), 10 hour half-life period temperature=59° C., manufactured by NOF CORPORATION) was used as the radical polymerization initiator, t-butylperoxymethacryloyloxyethyl carbonate (MEC) was used as the radical (co)polymer organic peroxide, and 2,5-dimethyl-2,5-di(t-butylperoxy) hexane ("Perhexa 25B" (trade name), 10 hour half-life period temperature=118° C., manufactured by NOF CORPORATION) was used as the crosslinking agent.

Then, the temperature of the autoclave was increased to 60 to 65° C., and the solution was stirred for 3 hours. Accordingly, a monomer composition including the radical polymerization initiator and the radical (co)polymer organic peroxide was impregnated in the ethylene vinyl acetate copolymer.

After that, the temperature of the autoclave was increased to 80 to 85° C., and it was held at the time for 7 hours for polymerization. Then, by washing and drying it, an ethylene-vinyl acetate copolymer resin composition in which a poly(St/GMA/MEC) copolymer that is the (B) vinyl copolymer and 2,5-dimethyl-2,5-di(t-butylperoxy) hexane that is the (C) organic peroxide were impregnated in the (A) ethylene-vinyl acetate copolymer was obtained.

The poly(St/GMA/MEC) copolymer was extracted by ethyl acetate from the obtained ethylene-vinyl acetate copolymer resin composition. As a result of measurement by gel permeation chromatography (GPC), it has been found that the weight average molecular weight of the poly(St/GMA/MEC) copolymer was 400,000.

[Description of Comparative Examples 1-1 to 1-4]

The ethylene-vinyl acetate copolymer resin composition according to the comparative example 1-1 does not include the (C) organic peroxide unlike the above-mentioned embodiments.

In the ethylene-vinyl acetate copolymer resin composition according to the comparative example 1-2, the content of a vinyl acetate in the (A) ethylene-vinyl acetate copolymer is larger than that in the above-mentioned embodiments.

In the ethylene-vinyl acetate copolymer resin composition according to the comparative example 1-3, the content of the (C) organic peroxide is larger than that in the above-mentioned embodiments.

In the ethylene-vinyl acetate copolymer resin composition according to the comparative example 1-4, low-density polyethylene is used instead of the (A) ethylene-vinyl acetate copolymer.

BW: benzoyl peroxide ("NYPER BW", 10 hour half-life period temperature=74° C., manufactured by NOF CORPORATION)

25B: 2,5-dimethyl-2,5-di (t-butylperoxy) hexane

BuE: t-butylperoxy-2-ethylhexyl monocarbonate ("PERBUTYL E", 10 hour half-life period temperature=99° C., manufactured by NOF CORPORATION)

[Manufacturing of (Y) Graft Copolymer]

In examples 2-1 to 2-13 and comparative examples 2-1 to 2-4, as shown in Table 2, the ethylene-vinyl acetate copolymer resin compositions according to the examples 1-1 to 1-13 and the comparative examples 1-1 to 1-4 were respectively used to manufacture graft copolymers. As an example, a manufacturing process for the graft copolymer according to the example 2-1 will be described in the following. Note that also the graft copolymer according to other examples

TABLE 1

| | (A) EVA copolymer | | | | (B) Vinyl copolymer | | | | (b-4) Polymerization initiator | | (C) Organic peroxide | | |
|---|---|---|---|---|---|---|---|---|---|---|---|---|---|
| | Kind | VAc (%) | MFR$^{\times}$ (g/10 min) | Parts by weight | (b-1) St | (b-2) AN | (b-2) GMA | (b-3) MEC | Kind | T10 (° C.) | Kind | T10 (° C.) | Parts by weight |
| | | | | | Parts by weight | | | | | | | | |
| Example 1-1 | EVA | 6 | 2.5 | 70 | 21 | | 9 | 0.9 | R355 | 59 | 25B | 118 | 0.35 |
| Example 1-2 | EVA | 6 | 2.5 | 70 | 21 | | 9 | 0.9 | R355 | 59 | 25B | 118 | 0.70 |
| Example 1-3 | EVA | 6 | 2.5 | 70 | 21 | | 9 | 0.9 | R355 | 59 | BuE | 99 | 0.35 |
| Example 1-4 | EVA | 6 | 2.5 | 70 | 21 | | 9 | 0.9 | BW | 74 | 25B | 118 | 0.35 |
| Example 1-5 | EVA | 6 | 2.5 | 70 | 21 | | 9 | 0.9 | BW | 74 | BuE | 99 | 0.35 |
| Example 1-6 | EVA | 6 | 2.5 | 70 | 21 | 9 | | 0.9 | R355 | 59 | 25B | 118 | 0.35 |
| Example 1-7 | EVA | 6 | 2.5 | 70 | 21 | 6 | 3 | 0.9 | R355 | 59 | 25B | 118 | 0.35 |
| Example 1-8 | EVA | 6 | 2.5 | 50 | 35 | | 15 | 1.5 | R355 | 59 | 25B | 118 | 0.35 |
| Example 1-9 | EVA | 6 | 2.5 | 50 | 35 | 15 | | 1.5 | R355 | 59 | 25B | 118 | 0.35 |
| Example 1-10 | EVA | 6 | 2.5 | 50 | 35 | 10 | 5 | 1.5 | R355 | 59 | 25B | 118 | 0.35 |
| Example 1-11 | EVA | 15 | 3.0 | 70 | 21 | | 9 | 0.9 | R355 | 59 | 25B | 118 | 0.35 |
| Example 1-12 | EVA | 15 | 3.0 | 70 | 21 | 9 | | 0.9 | R355 | 59 | 25B | 118 | 0.35 |
| Example 1-13 | EVA | 15 | 3.0 | 70 | 21 | 6 | 3 | 0.9 | R355 | 59 | 25B | 118 | 0.35 |
| Comparative example 1-1 | EVA | 6 | 2.5 | 70 | 21 | | 9 | 0.9 | R355 | 59 | — | — | — |
| Comparative example 1-2 | EVA | 32 | 30 | 70 | 21 | | 9 | 0.9 | R355 | 59 | 25B | 118 | 0.35 |
| Comparative example 1-3 | EVA | 6 | 2.5 | 70 | 21 | | 9 | 0.9 | R355 | 59 | 25B | 118 | 3.50 |
| Comparative example 1-4 | LDPE | — | 4 | 70 | 21 | | 9 | 0.9 | R355 | 59 | 25B | 118 | 0.35 |

$^{\times}$190° C./2.16 kgf

Meanings of abbreviations in Table 1 are as follows.

EVA: ethylene vinyl acetate copolymer (any of the following three kinds is appropriately used in each example and comparative example)

(I) "Ultracene 510" manufactured by TOSOH corporation, VAc content of 6%, MFR=2.5 (g/10 min)

(II) "Ultracene 537" manufactured by TOSOH corporation, VAc content of 15%, MFR=3.0 (g/10 min)

(III) "Ultracene 750" manufactured by TOSOH corporation. VAc content of 32%, MFR=30 (g/10 min)

LDPE: low-density polyethylene ("SUMIKATHENE G401" manufactured by Sumitomo Chemical Co., Ltd., density=0.926 g/cm$^3$)

St: styrene

GMA: glycidyl methacrylate

AN: acrylonitrile

MEC: t-butylperoxymethacryloyloxyethyl carbonate

R355: di (3,5,5-trimethylhexanoyl) peroxide and comparative examples were manufactured in a process similar to that in the example 2-1.

[Manufacturing of Graft Copolymer According to Example 2-1]

First, the ethylene-vinyl acetate copolymer resin composition obtained in the example 1-1 was melt-kneaded at 200° C. by a Labo Plastomill single screw extruder (manufactured by Toyo Seiki Seisaku-sho Ltd.) to cause a grafting reaction. Accordingly, a graft copolymer including a main chain formed of an ethylene vinyl acetate copolymer and a side chain formed of poly(St/GMA) was obtained.

When the MFR (220° C./10 kgf) of the obtained graft copolymer was measured, it was 0.6 (g/10 min), and it was confirmed that the grafting reaction and the crosslinking reaction of the ethylene vinyl acetate copolymer progressed. Further, when the obtained graft copolymer was observed with a scanning electron microscope ("JEOL JSM T300" manufactured by JEOL Ltd.), spherical resins with a particle size of 0.1 to 0.2 μm were uniformly dispersed.

TABLE 2

| | Ethylene-vinyl acetate copolymer resin composition | MFR ** (g/10 min) |
|---|---|---|
| Example 2-1 | Example 1-1 | 0.6 |
| Example 2-2 | Example 1-2 | 0.1 |
| Example 2-3 | Example 1-3 | 1.1 |
| Example 2-4 | Example 1-4 | 0.7 |
| Example 2-5 | Example 1-5 | 0.1 |
| Example 2-6 | Example 1-6 | 0.1 |
| Example 2-7 | Example 1-7 | 0.1 |
| Example 2-8 | Example 1-8 | 0.2 |
| Example 2-9 | Example 1-9 | 0.1 |
| Example 2-10 | Example 1-10 | 0.2 |
| Example 2-11 | Example 1-11 | 1.0 |
| Example 2-12 | Example 1-12 | 0.1 |
| Example 2-13 | Example 1-13 | 0.2 |
| Comparative example 2-1 | Comparative example 1-1 | 4.5 |
| Comparative example 2-2 | Comparative example 1-2 | 12.8 |
| Comparative example 2-3 | Comparative example 1-3 | <0.01 |
| Comparative example 2-4 | Comparative example 1-4 | 2.6 |

** 220° C./10 kgf

2. Thermoplastic Resin Composition

In examples 3 to 12, as the thermoplastic resin composition, a polyacetal resin composition, a polyamide resin composition, a polycarbonate resin composition, an ABS resin composition, a PC/ABS resin composition were manufactured.

<Polyacetal Resin Composition>

In the examples 3 and 4, a polyacetal resin was used as the (X) thermoplastic resin according to the present invention to manufacture a polyacetal resin composition.

[Manufacturing of Polyacetal Resin Composition]

In examples 3-1 to 3-15 and comparative examples 3-1 to 3-5, a predetermined amount of the above-mentioned graft copolymer was appropriately dry-blended in a polyacetal resin ("DURACON M90-44 (trade name) manufactured by Polyplastics Co., Ltd.) with the mixing ratio shown in Table 3, they were melt-kneaded by a twin-screw extruder set to be 190° C., and thus, a polyacetal resin composition was obtained. In Table 3, the polyacetal resin was abbreviated as "POM".

In the example 4, the polyacetal resin composition was manufactured by a method similar to that in the example 3-1 except that the (Z-1) lubricant or the (Z-2) inorganic filler was added with the mixing ratio shown in Table 4.

Note that the polyacetal resin composition according to the comparative example 3-1 was manufactured only with a polyacetal resin, and the graft copolymer was not used. The graft copolymers obtained in the examples 2-1 to 2-13 were used in the examples 3-1 to 3-15, and the graft copolymers according to the comparative examples 2-1 to 2-4 were respectively used in the comparative examples 3-2 to 3-5.

[Manufacturing of Evaluation Material]

The polyacetal resin compositions according to the examples 3-1 to 3-15, examples 4-1 to 4-8, and the comparative examples 3-1 to 3-5 were molded by an injection molding machine, and thus, the evaluation materials according to the examples 3-1 to 3-15 and the comparative examples 3-1 to 3-5 were manufactured. As conditions of the injection molding, the barrel temperature was 200° C. and the mold temperature was 90° C.

[Evaluation Method]

Tensile Strength

Conforming to JIS K-7113, the test was performed at the speed of 50 mm/min. The target value of a tensile strength was determined depending on the kind of the (X) thermoplastic resin, and was not less than 50 MPa in the case where a polyacetal resin was used.

Flexural Modulus

Conforming to JIS K-7203, the test was performed at the speed of 2 mm/min. The target value of a flexural modulus was determined depending on the kind of the (X) thermoplastic resin, and was not less than 1.5 GPa in the case where a polyacetal resin was used.

Sliding property evaluation 1 (thrust friction wear test)

Test machine: friction wear tester EFM-III-F manufactured by Orientec Co., Ltd.

Evaluation material: cylindrical material with an inner diameter of 20 mm and an outer diameter of 25.6

Quality of evaluation material: polyacetal resin composition having the composition shown in Table 3

Mate material: cylindrical material with an inner diameter of 20 mm and an outer diameter of 25.6 mm Quality of mate material: (1) carbon steel (S45C), (2) the same material as the evaluation material Test conditions (when the quality of the mate material is (1)): load 50 N, linear speed 50 cm/sec Test conditions (when the quality of the mate material is (2)): load 20 N, linear speed 50 cm/sec Test time: 100 minutes In this test, the wear amount (mg) and dynamic friction coefficient of each evaluation material were obtained for each quality of the mating materials (1) and (2). The target values of the wear amount and dynamic friction coefficient are determined depending on the kind of the (X) thermoplastic resin. In the case where a polyacetal resin was used, the target value of the wear amount was set to not more than 2.0 mg and the target value of the dynamic friction coefficient was set to not more than 0.25 in the case where the mating member was the (1) carbon steel (S45C). Further, in the case where the mating material was the same material as the (2) evaluation material, the target value of the wear amount was set to not more than 2.0 mg and the target value of the dynamic friction coefficient was set to not more than 0.25.

Sliding property evaluation 2 (reciprocating sliding test)

Testing machine: Rubbing tester manufactured by Imoto Machinery Co., Ltd. 1566-A Evaluation material: flat plate with a length of 80 mm, a width of 10 mm, and a height of 4 mm Quality of evaluation material: polyacetal resin composition having the composition shown in Tables 3 and 4

Mating material: cylindrical material with a diameter of 10 mm

Quality of mating material: Duracon M90-44 (manufactured by Polyplastics Co., Ltd.)

Test conditions: load 3 kgf, linear speed 100 mm/sec, 5000 reciprocations

In this test, the wear amount (mg) of each evaluation material was obtained. The target value of the wear amount was set to not more than 10.0 mg.

Evaluation of Squeaking Sound

The obtained evaluation material and a polyacetal resin ("Duracon M90-44" (trade name) manufactured by Polyplastics Co., Ltd.) were respectively cut as a plate for squeaking sound evaluation test (60 mm×100 mm×2 mm) and a plate for a mate material to be rubbed (50 mm×25 mm×2 mm), and after deburring, the condition was adjusted at the temperature of 25° C. and the humidity of 50% for 12 hours.

The plate for squeaking sound evaluation test and each plate as a mate material were fixed to a stick-slip measuring device SSP-02 manufactured by manufactured by Ziegler instruments GmbH, and the squeaking sound risk value at the time when they were rubbed with each other under the conditions of a load=40 N and a speed=1 mm/sec was measured. Note that as the squeaking sound risk value is reduced, the risk of generation of squeaking sound is lower. The criteria for judging the squeaking sound risk value are as follows.

Squeaking sound risk value 1 to 3: risk of generation of squeaking sound is low

Squeaking sound risk value 4 to 5: risk of generation of squeaking sound is slightly high Squeaking sound risk value 6 to 10: risk of generation of squeaking sound is high In these examples and comparative examples, the target value of the squeaking sound risk value was not more than 3.

[Evaluation Results]

The evaluation results of the evaluation materials according to the examples 3-1 to 3-15 and the comparative examples 3-1 to 3-5 are shown in Table 3.

The evaluation results of the evaluation materials according to the examples 4-1 to 4-8 are shown in Table 4.

TABLE 3

| | (X) Thermo-plastic resin | | (Y) Graft copolymer | | Mechanical properties | | Evaluation of sliding properties | | | | | |
|---|---|---|---|---|---|---|---|---|---|---|---|---|
| | | | | | | | (1) Against S45C | | (2) Against same material | | Reciprocating sliding test | |
| | Kind | Parts by weight | Kind | Parts by weight | Tensile strength (mpa) | Flexural modulus (GPa) | Wear amount (mg) | Dynamic friction coefficient | Wear amount (mg) | Dynamic friction coefficient | Wear amount (mg) | Squeaking sound risk value |
| Example 3-1 | POM | 100 | Example 2-1 | 11 | 50 | 1.9 | 0.8 | 0.18 | 1.8 | 0.16 | 5.4 | 1 |
| Example 3-2 | POM | 100 | Example 2-1 | 1 | 60 | 2.3 | 1.9 | 0.23 | 2.0 | 0.22 | 9.8 | 3 |
| Example 3-3 | POM | 100 | Example 2-1 | 5 | 54 | 1.9 | 1.6 | 0.20 | 1.9 | 0.19 | 4.8 | 2 |
| Example 3-4 | POM | 100 | Example 2-2 | 11 | 51 | 2.0 | 0.1 | 0.18 | 0.4 | 0.15 | 3.4 | 1 |
| Example 3-5 | POM | 100 | Example 2-3 | 11 | 50 | 1.8 | 1.1 | 0.17 | 1.3 | 0.14 | 6.9 | 1 |
| Example 3-6 | POM | 100 | Example 2-4 | 11 | 51 | 2.0 | 1.2 | 0.19 | 1.8 | 0.17 | 7.8 | 2 |
| Example 3-7 | POM | 100 | Example 2-5 | 11 | 51 | 1.9 | 1.4 | 0.18 | 1.8 | 0.18 | 6.7 | 2 |
| Example 3-8 | POM | 100 | Example 2-6 | 11 | 50 | 2.3 | 0.6 | 0.18 | 1.9 | 0.20 | 3.5 | 2 |
| Example 3-9 | POM | 100 | Example 2-7 | 11 | 50 | 2.2 | 0.5 | 0.18 | 1.1 | 0.16 | 4.3 | 1 |
| Example 3-10 | POM | 100 | Example 2-8 | 11 | 51 | 1.8 | 1.8 | 0.19 | 1.9 | 0.17 | 9.0 | 2 |
| Example 3-11 | POM | 100 | Example 2-9 | 11 | 50 | 2.2 | 0.8 | 0.19 | 2.0 | 0.20 | 9.8 | 2 |
| Example 3-12 | POM | 100 | Example 2-10 | 11 | 52 | 1.8 | 1.7 | 0.21 | 2.0 | 0.20 | 9.1 | 3 |
| Example 3-13 | POM | 100 | Example 2-11 | 11 | 50 | 2.0 | 1.6 | 0.20 | 1.8 | 0.18 | 6.7 | 2 |
| Example 3-14 | POM | 100 | Example 2-12 | 11 | 50 | 2.1 | 2.0 | 0.20 | 1.9 | 0.17 | 4.2 | 2 |
| Example 3-15 | POM | 100 | Example 2-13 | 11 | 51 | 1.9 | 2.0 | 0.19 | 1.9 | 0.21 | 8.9 | 2 |
| Comparative example 3-1 | POM | 100 | — | — | 61 | 2.4 | 83.4 | 0.34 | 66.4 | 0.30 | 20.3 | 10 |
| Comparative example 3-2 | POM | 100 | Comparative example 2-1 | 11 | 48 | 1.6 | 12.1 | 0.23 | 2.7 | 0.19 | 14.5 | 7 |
| Comparative example 3-3 | POM | 100 | Comparative example 2-2 | 11 | 53 | 2.0 | 3.6 | 0.16 | 3.9 | 0.18 | 14.7 | 8 |
| Comparative example 3-4 | POM | 100 | Comparative example 2-3 | 11 | 52 | 1.7 | 2.2 | 0.15 | 5.9 | 0.19 | 17.7 | 6 |
| Comparative example 3-5 | POM | 100 | Comparative example 2-4 | 11 | 52 | 1.8 | 4.5 | 0.24 | 3.5 | 0.23 | 16.8 | 3 |
| Target value | | | | | 50 or more | 1.5 or more | 2.0 or less | 0.25 or less | 2.0 or less | 0.25 or less | 10.0 or less | 3 or less |

TABLE 4

| | (X) Thermo-plastic resin | | (Y) Graft copolymer | | (Z-1) Lubricant | | (Z-2) Inorganic filler | | Mechanical properties | |
|---|---|---|---|---|---|---|---|---|---|---|
| | Kind | Parts by weight | Kind | Parts by weight | Kind | Parts by weight | Kind | Parts by weight | Tensile strength (MPa) | Flexural modulus (GPa) |
| Example 4-1 | POM | 100 | Example 2-1 | 5 | SS | 1 | — | — | 54 | 1.9 |
| Example 4-2 | POM | 100 | Example 2-1 | 5 | SS | 3 | — | — | 52 | 1.8 |
| Example 4-3 | POM | 100 | Example 2-1 | 5 | GMS | 1 | — | — | 53 | 1.9 |
| Example 4-4 | POM | 100 | Example 2-1 | 5 | SA | 1 | — | — | 54 | 2.0 |
| Example 4-5 | POM | 100 | Example 2-1 | 5 | PEWAX | 1 | — | — | 53 | 2.0 |
| Example 4-6 | POM | 100 | Example 2-1 | 5 | PLWAX | 1 | — | — | 53 | 1.9 |
| Example 4-7 | POM | 100 | Example 2-1 | 5 | — | — | CaCO$_3$ | 5 | 56 | 2.8 |
| Example 4-8 | POM | 100 | Example 2-1 | 5 | — | — | TiK | 5 | 57 | 2.8 |
| Target value | | | | | | | | | 50 or more | 1.5 or more |

TABLE 4-continued

| | Evaluation of sliding properties | | | | | |
|---|---|---|---|---|---|---|
| | (1) Against S45C | | (2) Against same material | | Reciprocating | |
| | Wear amount (mg) | Dynamic friction coefficient | Wear amount (mg) | Dynamic friction coefficient | sliding test Wear amount (mg) | Squeaking sound risk value |
| Example 4-1 | 1.6 | 0.16 | 1.0 | 0.18 | 4.6 | 1 |
| Example 4-2 | 1.0 | 0.16 | 1.5 | 0.17 | 3.0 | 1 |
| Example 4-3 | 1.2 | 0.18 | 1.3 | 0.19 | 5.1 | 1 |
| Example 4-4 | 0.8 | 0.16 | 1.0 | 0.16 | 3.3 | 1 |
| Example 4-5 | 0.9 | 0.15 | 1.2 | 0.16 | 4.4 | 1 |
| Example 4-6 | 1.0 | 0.16 | 1.4 | 0.16 | 4.2 | 1 |
| Example 4-7 | 1.7 | 0.20 | 1.8 | 0.20 | 2.0 | 2 |
| Example 4-8 | 1.3 | 0.19 | 1.6 | 0.19 | 1.5 | 3 |
| Target value | 2.0 or less | 0.25 or less | 2.0 or less | 0.25 or less | 10.0 or less | 3 or less |

Meanings of abbreviations in Table 4 are as follows.
SS: stearyl stearate
GMS: glycerin monostearate
SA: stearic acid amide
PEWAX: polyethylene wax
PLWAX: paraffin wax
$CaCO_3$: calcium carbonate (cubic, fatty acid treated)
TiK: potassium titanate
Mechanical Properties In any of the evaluation materials according to the examples 3-1 to 3-15 and the examples 4-1 to 4-8, a large value not less than 50 MPa of a tensile strength and a large value not less than 1.5G Pa of a flexural modulus were obtained. Meanwhile, in the evaluation material according to the comparative example 3-2 that includes no (C) organic peroxide, the tensile strength has a small value less than 50 MPa.

Sliding Property Evaluation

In any of the evaluation materials according to the examples 3-1 to 3-15 and the examples 4-1 to 4-8, a small value of not more than 2.0 mg of the wear amount and a small value of not more than 0.25 of the dynamic friction coefficient were obtained in a thrust friction wear test in which the mate material was the (1) carbon steel (S45C).

Further, in any of the evaluation materials according to the examples 3-1 to 3-15 and the examples 4-1 to 4-8, a small value of not more than 2.0 mg of the wear amount and a small value of not more than 0.25 of the dynamic friction coefficient were obtained even in a thrust friction wear test in which the mate material was the (2) evaluation material, i.e., in a thrust friction wear test using the evaluation materials with each other.

Furthermore, in any of the evaluation materials according to the examples 3-1 to 3-15 and the examples 4-1 to 4-8, a small value of not more than 10.0 mg of the wear amount was obtained in a reciprocating sliding test.

Meanwhile, in any of the evaluation materials according to the comparative examples 3-1 to 3-5, the wear amount had a value larger than 2.0 mg in a thrust friction wear test in which the mate material was the (1) carbon steel (S45C). In addition, in the evaluation material according to the comparative example 3-1 that includes no (Y) graft copolymer, the dynamic friction coefficient had a value larger than 0.25.

Further, in any of the evaluation materials according to comparative examples 3-1 to 3-5, the wear amount had a value larger than 2.0 mg even in a thrust friction wear test in which the mate material was the (2) evaluation material, i.e., in a thrust friction wear test using the evaluation materials with each other. In addition, in the evaluation material according to the comparative example 3-1 that includes no (Y) graft copolymer, also the dynamic friction coefficient had a value larger than 0.25.

Furthermore, in any of the evaluation materials according to the comparative examples 3-1 to 3-5, the wear amount had a value larger than 10.0 mg in a reciprocating sliding test.

Squeaking Sound Risk Evaluation

In any of the evaluation materials according to the examples 3-1 to 3-15 and the examples 4-1 to 4-8, the squeaking sound risk value was a small value not more than 3. Meanwhile, in the evaluation materials according to the comparative examples 3-1 to 3-5, the squeaking sound risk had a value larger than 3.

<Polyamide Resin Composition>

In the examples 5 to 8, a polyamide resin was used as the (X) thermoplastic resin according to the present invention to manufacture a polyamide resin composition.

Specifically, in the examples 5 to 8, respectively, the following four kinds of (X) polyamide resins were mixed with the (Y) graft copolymer, a polyamide resin composition was obtained.

Nylon 66: "Zytel 103 HSL" (trade name) manufactured by DuPont Co. (hereinafter abbreviated as "PA66").

Nylon 66 including glass fiber: "Zytel 103 HSL 33HS1L" (trade name) manufactured by DuPont Co. (hereinafter abbreviated as "PA66GGF")

Nylon 6: "Amilan CM 1017 A" (trade name) manufactured by Toray Industries, Inc. (abbreviated as "PA6").

Nylon MXD6: "MX Nylon 56001" (trade name) manufactured by Mitsubishi Gas Chemical Company, Inc. (abbreviated as "PAMXD")

[Manufacturing of Polyamide Resin Composition (PA66)]

In the example 5, the PA66 was used as the (X).

In examples 5-1 to 5-15 and comparative examples 5-1 to 5-5, the (Y) graft copolymer was added to the (X) polyamide resin (PA66) with the mixing ratio shown in Table 5, they were melt-kneaded by a twin-screw extruder set to be 270° C., and thus, a polyamide resin composition was obtained.

Note that the polyamide resin composition according to the comparative example 5-1 was manufactured only with the (X) polyamide resin, and the (Y) graft copolymer was not used. The (Y) graft copolymers obtained in the examples 2-1 to 2-13 were used in the examples 5-1 to 5-15, and the (Y) graft copolymers obtained in the comparative examples 2-1 to 2-4 were respectively used in the comparative examples 5-2 to 5-5.

[Manufacturing of Evaluation Material (PA66)]

In the examples 5-1 to 5-15 and the comparative examples 5-1 to 5-5, the method of manufacturing the evaluation material is similar to that in the examples 3-1 to 3-15 and the comparative examples 3-1 to 3-5 except that the barrel temperature was 275° C. and the mold temperature was 80° C.

[Evaluation Method (PA66)]

In the examples 5-1 to 5-15 and the comparative examples 5-1 to 5-5, the sliding property evaluation 2 was not performed and only the sliding property evaluation 1 was performed in the evaluation method. The sliding property evaluation 1 was performed in the same method as that in the example 3.

[Evaluation Results (PA66)]

The evaluation results of the evaluation materials according to the examples 5-1 to 5-15 and the comparative examples 5-1 to 5-5 are shown in Table 5. The target values of each evaluation were appropriately changed depending on the kind of the (X) thermoplastic resin, and were as shown in Table 5.

in the case where the mate material was the same material as the (2) evaluation material significantly exceeded the target value. Further, in the comparative example 5-1, the squeaking sound risk value in any of the case where the mate material was the (1) carbon steel (S45C) and the case where the mate material was the same material as the (2) evaluation material significantly exceeded the target value.

In the comparative example 5-2, the tensile strength and the flexural modulus didn't satisfy the respective target values. Further, in the comparative example 5-2, the wear amount in the case where the mate material was the (1) carbon steel (S45C) and in the case where the mate material was the same material as the (2) evaluation material exceeded the target value. Furthermore, in the comparative example 5-2, the squeaking sound risk value in any of the case where the mate material was the (1) carbon steel (S45C) and the case where the mate material was the same material as the (2) evaluation material exceeded the target value.

In the comparative example 5-3, the wear amount in the case where the mate material was the same material as the (2) evaluation material exceeded the target value. Further, in the comparative example 5-3, the squeaking sound risk value in any of the case where the mate material was the (1) carbon steel (S45C) and the case where the mate material was the same material as the (2) evaluation material exceeded the target value.

TABLE 5

| | (X) Thermoplastic resin | | (Y) Graft copolymer | | Mechanical properties | | Evaluation of sliding properties | | | | Squeaking sound risk value | |
|---|---|---|---|---|---|---|---|---|---|---|---|---|
| | | | | | | | (1) Against S45C | | (2) Against same material | | | (2) |
| | Kind | Parts by weight | Kind | Parts by weight | Tensile strength (MPa) | Flexural modulus (GPa) | Wear amount (mg) | Dynamic friction coefficient | Wear amount (mg) | Dynamic friction coefficient | (1) Against S45C | Against same material |
| Example 5-1 | PA66 | 100 | Example 2-1 | 11 | 80 | 2.5 | 0.3 | 0.25 | 1.1 | 0.30 | 1 | 2 |
| Example 5-2 | PA66 | 100 | Example 2-1 | 1 | 90 | 2.8 | 1.9 | 0.34 | 3.4 | 0.33 | 3 | 3 |
| Example 5-3 | PA66 | 100 | Example 2-1 | 5 | 85 | 2.7 | 1.5 | 0.30 | 3.1 | 0.31 | 1 | 2 |
| Example 5-4 | PA66 | 100 | Example 2-2 | 11 | 81 | 2.5 | 0.2 | 0.22 | 0.9 | 0.28 | 2 | 2 |
| Example 5-5 | PA66 | 100 | Example 2-3 | 11 | 80 | 2.4 | 0.5 | 0.26 | 1.2 | 0.30 | 1 | 2 |
| Example 5-6 | PA66 | 100 | Example 2-4 | 11 | 81 | 2.5 | 0.4 | 0.25 | 1.3 | 0.31 | 1 | 2 |
| Example 5-7 | PA66 | 100 | Example 2-5 | 11 | 81 | 2.4 | 0.3 | 0.26 | 1.2 | 0.32 | 2 | 2 |
| Example 5-8 | PA66 | 100 | Example 2-6 | 11 | 81 | 2.3 | 0.6 | 0.27 | 1.4 | 0.30 | 2 | 2 |
| Example 5-9 | PA66 | 100 | Example 2-7 | 11 | 80 | 2.4 | 0.9 | 0.24 | 1.2 | 0.31 | 1 | 2 |
| Example 5-10 | PA66 | 100 | Example 2-8 | 11 | 81 | 2.5 | 1.8 | 0.27 | 2.2 | 0.30 | 2 | 2 |
| Example 5-11 | PA66 | 100 | Example 2-9 | 11 | 82 | 2.3 | 1.9 | 0.28 | 2.6 | 0.32 | 2 | 2 |
| Example 5-12 | PA66 | 100 | Example 2-10 | 11 | 82 | 2.4 | 1.2 | 0.27 | 2.3 | 0.30 | 2 | 2 |
| Example 5-13 | PA66 | 100 | Example 2-11 | 11 | 81 | 2.5 | 1.7 | 0.28 | 2.1 | 0.31 | 2 | 2 |
| Example 5-14 | PA66 | 100 | Example 2-12 | 11 | 81 | 2.4 | 1.9 | 0.28 | 2.4 | 0.31 | 2 | 2 |
| Example 5-15 | PA66 | 100 | Example 2-13 | 11 | 80 | 2.4 | 2.0 | 0.29 | 2.3 | 0.32 | 2 | 2 |
| Comparative example 5-1 | PA66 | 100 | — | — | 93 | 2.9 | 2.3 | 0.61 | 31.2 | 0.34 | 9 | 10 |
| Comparative example 5-2 | PA66 | 100 | Comparative example 2-1 | 11 | 78 | 2.1 | 2.1 | 0.24 | 5.6 | 0.32 | 4 | 5 |
| Comparative example 5-3 | PA66 | 100 | Comparative example 2-2 | 11 | 82 | 2.3 | 1.9 | 0.28 | 6.9 | 0.31 | 5 | 5 |
| Comparative example 5-4 | PA66 | 100 | Comparative example 2-3 | 11 | 79 | 2.3 | 1.7 | 0.25 | 4.2 | 0.29 | 3 | 3 |
| Comparative example 5-5 | PA66 | 100 | Comparative example 2-4 | 11 | 81 | 2.4 | 2.2 | 0.17 | 5.3 | 0.30 | 3 | 3 |
| Target value | | | | | 80 or more | 2.3 or more | 2.0 or less | 0.35 or less | 5.0 or less | 0.35 or less | 3 or less | 3 or less |

As is evident from Table 5, the target values for each of mechanical properties, sliding property evaluation, and the squeaking sound risk value were achieved in the examples 5-1 to 5-15.

In contrast, in the comparative example 5-1, the wear amount and the dynamic friction coefficient in the case where the mate material was the (1) carbon steel (S45C) exceeded the respective target values, and the wear amount In the comparative example 5-4, the tensile strength didn't satisfy the target value.

In the comparative example 5-5, the wear amount in any of the case where the mate material was the (1) carbon steel (S45C) and the case where the mate material was the same material as the (2) evaluation material exceeded the target value.

[Manufacturing of Polyamide Resin Composition (PA66GF)]

In the example 6, the PA66GF was used as the (X).

In examples 6-1 to 6-6 and a comparative example 6-1, a predetermined amount of the (Y) graft copolymer was appropriately was dry-blended in the (X) polyamide resin (PA66GF) with the mixing ration shown in Table 6, they were melt-kneaded by a twin-screw extruder set to be 270° C., and thus, a polyamide resin composition was obtained.

Note that the polyamide resin composition according to the comparative example 6-1 was manufactured only with the (X) polyamide resin, and the (Y) graft copolymer was not used. In the examples 6-1 to 6-6, the (Y) graft copolymers obtained in the examples 2-1, 2-6, 2-7, and 2-11 were used.

[Manufacturing of Evaluation Material (PA66GF)]

In the examples 6-1 to 6-6 and the comparative example 6-1, the method of manufacturing the evaluation material is similar to that in the examples 3-1 to 3-15 and the comparative examples 3-1 to 3-5 except that the barrel temperature was 275° C. and the mold temperature was 80° C.

[Evaluation Method (PA66GF)]

In the examples 6-1 to 6-6 and the comparative example 6-1, the sliding property evaluation 2 was not performed and only the sliding property evaluation 1 was performed in the evaluation method. The sliding property evaluation 1 was performed in the same method as that in the example 3.

[Evaluation Results (PA66GF)]

The evaluation results of the evaluation materials according to the examples 6-1 to 6-6 and the comparative example 6-1 are shown in Table 6. The target values of each evaluation were appropriately changed depending on the kind of the (X) thermoplastic resin, and were as shown in Table 6.

material as the (2) evaluation material exceeded the target value. Furthermore, in the comparative example 6-1, the squeaking sound risk value in any of the case where the mate material was the (1) carbon steel (S45C) and the case where the mate material was the same material as the (2) evaluation material significantly exceeded the target value.

[Manufacturing of Polyamide Resin Composition (PA6)]

In the example 7, the PA6 was used as the (X).

In examples 7-1 to 7-6 and a comparative example 7-1, a predetermined amount of the (Y) graft copolymer was appropriately was dry-blended in the (X) polyamide resin (PA6) with the mixing ration shown in Table 7, they were melt-kneaded by a twin-screw extruder set to be 240° C., and thus, a polyamide resin composition was obtained.

Note that the polyamide resin composition according to the comparative example 7-1 was manufactured only with the (X) polyamide resin, and the (Y) graft copolymer was not used. In the examples 7-1 to 7-6, the (Y) graft copolymers obtained in the examples 2-1, 2-6, 2-7, and 2-11 were used.

[Manufacturing of Evaluation Material (PA6)]

In the examples 7-1 to 7-6 and the comparative example 7-1, the method of manufacturing the evaluation material is similar to that in the examples 3-1 to 3-15 and the comparative examples 3-1 to 3-5 except that the barrel temperature was 245° C. and the mold temperature was 80° C.

[Evaluation Method (PA6)]

In the examples 7-1 to 7-6 and the comparative example 7-1, the sliding property evaluation 2 was not performed and

TABLE 6

| | (X) Thermoplastic resin | | (Y) Graft copolymer | | Mechanical properties | | Evaluation of sliding properties | | | | Squeaking sound risk value |
|---|---|---|---|---|---|---|---|---|---|---|---|
| | | | | | | | (1) Against S45C | | (2) Against same material | | (2) |
| | Kind | Parts by weight | Kind | Parts by weight | Tensile strength (MPa) | Flexural modulus (GPa) | Wear amount (mg) | Dynamic friction coefficient | Wear amount (mg) | Dynamic friction coefficient | (1) Against S45C | Against same material |
| Example 6-1 | PA66GF | 100 | Example 2-1 | 11 | 106 | 4.6 | 1.9 | 0.32 | 1.9 | 0.19 | 1 | 2 |
| Example 6-2 | PA66GF | 100 | Example 2-1 | 1 | 119 | 5.4 | 2.0 | 0.35 | 4.5 | 0.29 | 3 | 3 |
| Example 6-3 | PA66GF | 100 | Example 2-1 | 5 | 112 | 4.9 | 2.0 | 0.35 | 3.8 | 0.22 | 2 | 3 |
| Example 6-4 | PA66GF | 100 | Example 2-6 | 11 | 105 | 4.7 | 1.9 | 0.32 | 1.8 | 0.19 | 1 | 2 |
| Example 6-5 | PA66GF | 100 | Example 2-7 | 11 | 106 | 4.6 | 2.0 | 0.33 | 2.0 | 0.21 | 1 | 2 |
| Example 6-6 | PA66GF | 100 | Example 2-11 | 11 | 105 | 4.5 | 2.0 | 0.32 | 2.0 | 0.22 | 2 | 2 |
| Comparative example 6-1 | PA66GF | 100 | — | — | 125 | 5.8 | 2.3 | 0.38 | 5.8 | 0.31 | 9 | 9 |
| Target value | | | | | 100 or more | 4.5 or more | 2.0 or less | 0.35 or less | 5.0 or less | 0.35 or less | 3 or less | 3 or less |

As is evident from Table 6, the target values for each of mechanical properties, sliding property evaluation, and the squeaking sound risk value were achieved in the examples 6-1 to 6-6.

In contrast, in the comparative example 6-1, the wear amount and the dynamic friction coefficient in the case where the mate material was the (1) carbon steel (S45C) exceeded the respective target values. Further, the wear amount in the case where the mate material was the same only the sliding property evaluation 1 was performed in the evaluation method. The sliding property evaluation 1 was performed in the same method as that in the example 3.

[Evaluation Results (PA6)]

The evaluation results of the evaluation materials according to the examples 7-1 to 7-6 and the comparative example 7-1 are shown in Table 7. The target values of each evaluation were appropriately changed depending on the kind of the (X) thermoplastic resin, and were as shown in Table 7.

TABLE 7

| | (X) Thermoplastic resin | | (Y) Graft copolymer | | Mechanical properties | | Evaluation of sliding properties | | | | Squeaking sound risk value | |
|---|---|---|---|---|---|---|---|---|---|---|---|---|
| | | | | | | | (1) Against S45C | | (2) Against same material | | (1) | (2) |
| | Kind | Parts by weight | Kind | Parts by weight | Tensile strength (MPa) | Flexural modulus (GPa) | Wear amount (mg) | Dynamic friction coefficient | Wear amount (mg) | Dynamic friction coefficient | Against S45C | Against same material |
| Example 7-1 | PA6 | 100 | Example 2-1 | 11 | 60 | 2.2 | 0.8 | 0.20 | 4.7 | 0.24 | 2 | 2 |
| Example 7-2 | PA6 | 100 | Example 2-1 | 1 | 74 | 2.4 | 1.7 | 0.33 | 5.0 | 0.34 | 3 | 3 |
| Example 7-3 | PA6 | 100 | Example 2-1 | 5 | 65 | 2.4 | 1.5 | 0.28 | 5.0 | 0.28 | 2 | 2 |
| Example 7-4 | PA6 | 100 | Example 2-6 | 11 | 61 | 2.1 | 0.9 | 0.21 | 4.6 | 0.23 | 2 | 2 |
| Example 7-5 | PA6 | 100 | Example 2-7 | 11 | 62 | 2.2 | 1.2 | 0.22 | 4.5 | 0.23 | 2 | 2 |
| Example 7-6 | PA6 | 100 | Example 2-11 | 11 | 62 | 2.2 | 1.0 | 0.24 | 4.7 | 0.24 | 2 | 2 |
| Comparative example 7-1 | PA6 | 100 | — | — | 81 | 2.7 | 2.0 | 0.70 | Melted | | 9 | 9 |
| Target value | | | | | 60 or more | 2.0 or more | 2.0 or less | 0.35 or less | 5.0 or less | 0.35 or less | 3 or less | 3 or less |

As is evident from Table 7, the target values for each of mechanical properties, sliding property evaluation, and the squeaking sound risk value were achieved in the examples 7-1 to 7-6.

In contrast, in the comparative example 7-1, the dynamic friction coefficient in the case where the mate material was the (1) carbon steel (S45C) significantly exceeded the target value. Further, the evaluation material was melt in a thrust friction wear test in which the mate material was the same material as the (2) evaluation material. Furthermore, in the comparative example 7-1, the squeaking sound risk value in any of the case where the mate material was the (1) carbon steel (S45C) and the case where the mate material was the same material as the (2) evaluation material significantly exceeded the target value.

[Manufacturing of Polyamide Resin Composition (PAMXD)]

In the example 8, the PAMXD was used as the (X).

In examples 8-1 to 8-6 and a comparative example 8-1, a predetermined amount of the (Y) graft copolymer was appropriately was dry-blended in the (X) polyamide resin (PAMXD) with the mixing ration shown in Table 8, they were melt-kneaded by a twin-screw extruder set to be 250° C., and thus, a polyamide resin composition was obtained.

Note that the polyamide resin composition according to the comparative example 8-1 was manufactured only with the (X) polyamide resin, and the (Y) graft copolymer was not used. In the examples 8-1 to 8-6, the (Y) graft copolymers obtained in the examples 2-1, 2-6, 2-7, and 2-11 were used.

[Manufacturing of Evaluation Material (PAMXD)]

In the examples 8-1 to 8-6 and the comparative example 8-1, the method of manufacturing the evaluation material is similar to that in the examples 3-1 to 3-15 and the comparative examples 3-1 to 3-5 except that the barrel temperature was 255° C. and the mold temperature was 80° C.

[Evaluation Method (PAMXD)]

In the examples 8-1 to 8-6 and the comparative example 8-1, the sliding property evaluation 2 was not performed and only the sliding property evaluation 1 was performed in the evaluation method. The sliding property evaluation 1 was performed in the same method as that in the example 3.

[Evaluation Results (PAMXD)]

The evaluation results of the evaluation materials according to the examples 8-1 to 8-6 and the comparative example 8-1 are shown in Table 8. The target values of each evaluation were appropriately changed depending on the kind of the (X) thermoplastic resin, and were as shown in Table 8.

TABLE 8

| | (X) Thermoplastic resin | | (Y) Graft copolymer | | Mechanical properties | | Evaluation of sliding properties | | | | Squeaking sound risk value | |
|---|---|---|---|---|---|---|---|---|---|---|---|---|
| | | | | | | | (1) Against S45C | | (2) Against same material | | (1) | (2) |
| | Kind | Parts by weight | Kind | Parts by weight | Tensile strength (MPa) | Flexural modulus (GPa) | Wear amount (mg) | Dynamic friction coefficient | Wear amount (mg) | Dynamic friction coefficient | Against S45C | Against same material |
| Example 8-1 | PAMXD | 100 | Example 2-1 | 11 | 82 | 3.5 | 1.2 | 0.18 | 3.8 | 0.23 | 2 | 2 |
| Example 8-2 | PAMXD | 100 | Example 2-1 | 1 | 90 | 4.0 | 2.0 | 0.26 | 5.0 | 0.33 | 3 | 3 |
| Example 8-3 | PAMXD | 100 | Example 2-1 | 5 | 86 | 3.8 | 1.9 | 0.20 | 4.9 | 0.28 | 2 | 3 |
| Example 8-4 | PAMXD | 100 | Example 2-6 | 11 | 81 | 3.5 | 1.1 | 0.19 | 3.7 | 0.24 | 1 | 2 |
| Example 8-5 | PAMXD | 100 | Example 2-7 | 11 | 81 | 3.6 | 1.2 | 0.19 | 3.4 | 0.22 | 2 | 2 |
| Example 8-6 | PAMXD | 100 | Example 2-11 | 11 | 82 | 3.5 | 1.3 | 0.18 | 3.6 | 0.23 | 2 | 3 |
| Comparative example 8-1 | PAMXD | 100 | — | — | 95 | 4.2 | 5.0 | 0.66 | 35.0 | 0.37 | 9 | 10 |
| Target value | | | | | 80 or more | 3.5 or more | 2.0 or less | 0.35 or less | 5.0 or less | 0.35 or less | 3 or less | 3 or less |

As is evident from Table 8, the target values for each of mechanical properties, sliding property evaluation, and the squeaking sound risk value were achieved in the examples 8-1 to 8-6.

In contrast, in the comparative example 8-1, the wear amount and the dynamic friction coefficient in the case where the mate material was the (1) carbon steel (S45C) significantly exceeded the target value. Further, the wear amount in the case where the mate material was the same material as the (2) evaluation material significantly exceeded the target value, and also the dynamic friction coefficient exceeded the target value. Furthermore, in the comparative example 8-1, the squeaking sound risk value in any of the case where the mate material was the (1) carbon steel (S45C) and the case where the mate material was the same material as the (2) evaluation material significantly exceeded the target value.

<Polycarbonate Resin Composition>

In the example 9, a polycarbonate resin was used as the (X) thermoplastic resin according to the present invention to manufacture a polycarbonate resin composition.

[Manufacturing of Polycarbonate Resin Composition]

In examples 9-1 to 9-15 and comparative examples 9-1 to 9-6, a predetermined amount of the (Y) graft copolymer was appropriately dry-blended in the (X) polycarbonate resin ("Tarflon A2200" (trade name), standard grade, manufactured by Idemitsu Kosan Co., Ltd., shown as "PC1" in Table 9 and Table 10) with the mixing ratio shown in Table 9 and Table 10, they were melt-kneaded by a twin-screw extruder set to be 260° C., and thus, a polycarbonate resin composition was obtained.

Note that the polycarbonate resin composition according to the comparative example 9-1 was manufactured only with the (X) polycarbonate resin, and the (Y) graft copolymer was not used. The (Y) graft copolymers obtained in the examples 2-1 to 2-13 were used in the examples 9-1 to 9-15, and the (Y) graft copolymers according to the comparative examples 2-1 to 2-4 were used in the comparative examples 9-2 to 9-6.

[Manufacturing of Evaluation Material]

In the examples 9-1 to 9-15 and the comparative examples 9-1 to 9-6, the method of manufacturing the evaluation material is similar to that in the examples 3-1 to 3-15 and the comparative examples 3-1 to 3-5 except that the barrel temperature was 265° C. and the mold temperature was 80° C.

[Evaluation Method]

In the examples 9-1 to 9-15 and the comparative examples 9-1 to 9-6, the sliding property evaluation 2 was not performed and only the sliding property evaluation 1 was performed in the evaluation method.

The mate material in the sliding property evaluation 1 was the (1) carbon steel (S45C), a (2) neat PC1 resin, a (3) polyethylene terephthalate resin, and a (4) polyethylene naphthalate resin. Note that the neat PC1 resin described herein is the (X) polycarbonate resin to which the (Y) graft copolymer is not added.

The test conditions in the case where the mate material was the (1) were a load: 50 N and a linear speed of 10 cm/sec, and the test conditions in the case where the mate material was the (2) to (4) were a load: 20 N and a linear speed: 10 cm/sec.

Further, the other conditions other than the above-mentioned mate material and test conditions (a load and linear speed) were similar to those in the example 3.

[Evaluation Results]

The evaluation results of the evaluation materials according to the examples 9-1 to 9-15 and the comparative examples 9-1 to 9-6 are shown in Table 9 and Table 10. The target values of each evaluation were appropriately changed depending on the kind of the (X) thermoplastic resin, and were as shown in Table 9 and Table 10.

TABLE 9

| | (X) Thermoplastic resin | | (Y) Graft copolymer | | Mechanical properties | | Evaluation of sliding properties | | | | Squeaking sound risk value | |
|---|---|---|---|---|---|---|---|---|---|---|---|---|
| | | | | | | | (1) Against S45C | | (2) Against neat PC1 | | | (2) |
| | Kind | Parts by weight | Kind | Parts by weight | Tensile strength (MPa) | Flexural modulus (GPa) | Wear amount (mg) | Dynamic friction coefficient | Wear amount (mg) | Dynamic friction coefficient | (1) Against S45C | Against neat PC1 |
| Example 9-1 | PC1 | 100 | Example 2-1 | 11 | 52 | 1.7 | 1.5 | 0.20 | 3.1 | 0.21 | 1 | 2 |
| Example 9-2 | PC1 | 100 | Example 2-1 | 1 | 60 | 2.1 | 2.2 | 0.24 | 5.0 | 0.25 | 3 | 3 |
| Example 9-3 | PC1 | 100 | Example 2-1 | 3 | 58 | 2.0 | 2.0 | 0.22 | 4.8 | 0.25 | 3 | 3 |
| Example 9-4 | PC1 | 100 | Example 2-2 | 11 | 51 | 1.8 | 1.2 | 0.19 | 3.0 | 0.22 | 1 | 2 |
| Example 9-5 | PC1 | 100 | Example 2-3 | 11 | 51 | 1.8 | 1.3 | 0.19 | 2.9 | 0.22 | 1 | 2 |
| Example 9-6 | PC1 | 100 | Example 2-4 | 11 | 51 | 1.9 | 1.4 | 0.19 | 2.9 | 0.22 | 1 | 1 |
| Example 9-7 | PC1 | 100 | Example 2-5 | 11 | 52 | 1.8 | 1.4 | 0.22 | 3.0 | 0.21 | 2 | 2 |
| Example 9-8 | PC1 | 100 | Example 2-6 | 11 | 52 | 1.8 | 1.5 | 0.19 | 4.0 | 0.21 | 1 | 2 |
| Example 9-9 | PC1 | 100 | Example 2-7 | 11 | 51 | 1.8 | 1.4 | 0.20 | 2.6 | 0.21 | 1 | 2 |
| Example 9-10 | PC1 | 100 | Example 2-8 | 11 | 49 | 1.7 | 2.1 | 0.24 | 3.8 | 0.24 | 2 | 2 |
| Example 9-11 | PC1 | 100 | Example 2-9 | 11 | 49 | 1.6 | 2.2 | 0.24 | 3.6 | 0.23 | 2 | 3 |
| Example 9-12 | PC1 | 100 | Example 2-10 | 11 | 50 | 1.7 | 2.1 | 0.25 | 3.6 | 0.22 | 2 | 3 |
| Example 9-13 | PC1 | 100 | Example 2-11 | 11 | 52 | 1.6 | 2.0 | 0.24 | 3.9 | 0.23 | 2 | 3 |
| Example 9-14 | PC1 | 100 | Example 2-12 | 11 | 50 | 1.8 | 2.0 | 0.24 | 3.7 | 0.22 | 2 | 2 |
| Example 9-15 | PC1 | 100 | Example 2-13 | 11 | 51 | 1.7 | 2.4 | 0.25 | 3.7 | 0.25 | 2 | 3 |
| Comparative example 9-1 | PC1 | 100 | — | — | 63 | 2.2 | 6.5 | 0.35 | 39.1 | 0.38 | 8 | 10 |
| Comparative example 9-2 | PC1 | 100 | Example 2-1 | 30 | 41 | 1.4 | 2.0 | 0.23 | 7.2 | 0.25 | 2 | 3 |
| Comparative example 9-3 | PC1 | 100 | Comparative example 2-1 | 11 | 51 | 1.7 | 3.2 | 0.23 | 8.3 | 0.23 | 2 | 2 |
| Comparative example 9-4 | PC1 | 100 | Comparative example 2-2 | 11 | 52 | 1.6 | 3.5 | 0.24 | 9.4 | 0.29 | 3 | 4 |

TABLE 9-continued

| | (X) Thermo-plastic resin | | (Y) Graft copolymer | | Mechanical properties | | Evaluation of sliding properties | | | | Squeaking sound risk value | |
|---|---|---|---|---|---|---|---|---|---|---|---|---|
| | | | | | | | (1) Against S45C | | (2) Against neat PC1 | | | (2) |
| | Kind | Parts by weight | Kind | Parts by weight | Tensile strength (MPa) | Flexural modulus (GPa) | Wear amount (mg) | Dynamic friction coefficient | Wear amount (mg) | Dynamic friction coefficient | (1) Against S45C | Against neat PC1 |
| Comparative example 9-5 | PC1 | 100 | Comparative example 2-3 | 11 | 52 | 1.5 | 2.4 | 0.22 | 4.2 | 0.24 | 3 | 5 |
| Comparative example 9-6 | PC1 | 100 | Comparative example 2-4 | 11 | 52 | 1.8 | 2.0 | 0.20 | 7.2 | 0.22 | 1 | 2 |
| | Target value | | | | 40 or more | 1.5 or more | 2.5 or less | 0.25 or less | 5.0 or less | 0.25 or less | 3 or less | 3 or less |

TABLE 10

| | (X) Thermo-plastic resin | | (Y) Graft copolymer | | Evaluation of sliding properties | | | |
|---|---|---|---|---|---|---|---|---|
| | | | | | (3) Against PET | | (4) Against PEN | |
| | Kind | Parts by weight | Kind | Parts by weight | Wear amount (mg) | Dynamic friction coefficient | Wear amount (mg) | Dynamic friction coefficient |
| Example 9-1 | PC1 | 100 | Example 2-1 | 11 | 3.3 | 0.22 | 3.5 | 0.20 |
| Example 9-2 | PC1 | 100 | Example 2-1 | 1 | 4.9 | 0.25 | 5.0 | 0.25 |
| Example 9-3 | PC1 | 100 | Example 2-1 | 3 | 4.5 | 0.25 | 4.9 | 0.25 |
| Example 9-8 | PC1 | 100 | Example 2-6 | 11 | 3.1 | 0.21 | 3.4 | 0.21 |
| Example 9-9 | PC1 | 100 | Example 2-7 | 11 | 3.2 | 0.22 | 3.5 | 0.21 |
| Example 9-13 | PC1 | 100 | Example 2-11 | 11 | 4.1 | 0.24 | 4.3 | 0.24 |
| Comparative example 9-1 | PC1 | 100 | — | — | Melted | | Melted | |
| | Target value | | | | 5.0 or less | 0.25 or less | 5.0 or less | 0.25 or less |

As is evident from Table 9 and Table 10, the target values for each of mechanical properties, sliding property evaluation, and the squeaking sound risk value were achieved in the examples 9-1 to 9-15.

In contrast, in the comparative example 9-1, the wear amount and the dynamic friction coefficient in any of the case where the mate material was the (1) carbon steel (S45C) and the case where the mate material was the (2) neat PC1 resin significantly exceeded the respective target values. Further, the evaluation material was melt in a thrust friction wear test in which the mate material was any of the (3) polyethylene terephthalate resin and the (4) polyethylene naphthalate resin. Furthermore, the squeaking sound risk value in any of the case where the mate material was the (1) carbon steel (S45C) and the case where the mate material was the (2) neat PC1 resin exceeded the target value.

In the comparative example 9-2, the flexural modulus didn't satisfy the target value. Further, in the comparative example 9-2, the wear amount in the case where the mate material was the (2) neat PC1 resin exceeded the target value.

In the comparative example 9-3, the wear amount in any of the case where the mate material was the (1) carbon steel (S45C) and the case where the mate material was the (2) neat PC1 resin exceeded the target value.

In the comparative example 9-4, the wear amount in the case where the mate material was the (1) carbon steel (S45C) exceeded the target value. Further, the wear amount and the dynamic friction coefficient in the case where the mate material was the (2) neat PC1 resin exceeded the respective target values. Further, the squeaking sound risk value in the case where the mate material was the (2) neat PC1 resin exceeded the target value.

In the comparative example 9-5, the squeaking sound risk value in the case where the mate material was the (2) neat PC1 resin exceeded the target value.

In the comparative example 9-6, the wear amount in the case where the mate material was the (2) neat PC1 resin exceeded the target value.

<ABS Resin Composition>

In an example 10, an ABS resin was used as the (X) thermoplastic resin according to the present invention to manufacture an ABS resin composition.

[Manufacturing of ABS Resin Composition]

In examples 10-1 to 10-15 and comparative examples 10-1 to 10-6, a predetermined amount of the (Y) graft copolymer was appropriately dry-blended in the (X) ABS resin ("Toyolac 700-314" (trade name), standard grade, manufactured by manufactured by Toray Industries, Inc. shown as "ABS1" in Table 11) with the mixing ratio shown in Table 11, they were melt-kneaded by a twin-screw extruder set to be 240° C., and thus, an ABS resin composition was obtained.

Note that the ABS resin composition according to the comparative example 10-1 was manufactured only with the (X) ABS resin, and the (Y) graft copolymer was not used. The (Y) graft copolymers obtained in the examples 2-1 to 2-13 were used in the examples 10-1 to 10-15, and the (Y) graft copolymers according to the example 2-1 and the comparative examples 2-1 to 2-4 were respectively used in the comparative examples 10-2 to 10-6.

[Manufacturing of Evaluation Material]

In the examples 10-1 to 10-15 and the comparative examples 10-1 to 10-6, the method of manufacturing the evaluation material is similar to that in the examples 3-1 to 3-15 and the comparative examples 3-1 to 3-5 except that the barrel temperature was 245° C. and the mold temperature was 80° C.

[Evaluation Method]

In the examples 10-1 to 10-15 and the comparative examples 10-1 to 10-6, the sliding property evaluation 2 was not performed and only the sliding property evaluation 1 was performed in the evaluation method.

The mate material in the sliding property evaluation 1 was the (1) carbon steel (S45C) and a neat ABS1 resin.

The test conditions in the case where the mate material was the (1) were a load: 50 N and a linear speed of 10 cm/sec, and the test conditions in the case where the mate material was the (2) neat ABS1 were a load: 20 N and a linear speed: 10 cm/sec. Note that the neat ABS1 resin described herein is the (X) ABS resin to which the (Y) graft copolymer is not added.

Further, the other conditions other than the above-mentioned mate material and test conditions (a load and linear speed) were similar to those in the example 3.

[Evaluation Results]

The evaluation results of the evaluation materials according to the examples 10-1 to 10-15 and the comparative examples 10-1 to 10-6 are shown in Table 11. The target values of each evaluation were appropriately changed depending on the kind of the (X) thermoplastic resin, and were as shown in Table 11.

As is evident from Table 11, the target values for each of mechanical properties, sliding property evaluation, and the squeaking sound risk value were achieved in the examples 10-1 to 10-15.

In contrast, in the comparative example 10-1, the wear amount and the dynamic friction coefficient in any of the case where the mate material was the (1) carbon steel (S45C) and the case where the mate material was the (2) neat ABS1 resin significantly exceeded the respective target values. Further, the squeaking sound risk value in any of the case where the mate material was the (1) carbon steel (S45C) and the case where the mate material was the (2) neat ABS1 resin exceeded the target value.

In the comparative example 10-2, the tensile strength and the flexural modulus didn't satisfy the respective target values. Further, the dynamic friction coefficient in the case where the mate material was the (2) neat ABS1 resin exceeded the target value. Furthermore, in the comparative example 10-2, the squeaking sound in any of the case where the mate material was the (1) carbon steel (S45C) and the case where the mate material was the (2) neat ABS1 resin exceeded the target value.

In the comparative example 10-3, the wear amount in any of the case where the mate material was the (1) carbon steel (S45C) and the case where the mate material was the (2) neat ABS1 resin exceeded the target value.

In the comparative example 10-4, the tensile strength and the flexural modulus didn't satisfy the respective target values. Further, the wear amount and the dynamic friction coefficient in the case where the mate material was the (1) carbon steel (S45C) exceeded the respective target values.

TABLE 11

| | (X) Thermoplastic resin | | (Y) Graft copolymer | | Mechanical properties | | Evaluation of sliding properties | | | | Squeaking sound risk value | |
|---|---|---|---|---|---|---|---|---|---|---|---|---|
| | | | | | | | (1) Against S45C | | (2) Against neat ABS1 | | (2) | |
| | Kind | Parts by weight | Kind | Parts by weight | Tensile strength (MPa) | Flexural modulus (GPa) | Wear amount (mg) | Dynamic friction coefficient | Wear amount (mg) | Dynamic friction coefficient | (1) Against S45C | Against neat ABS1 |
| Example 10-1 | ABS1 | 100 | Example 2-1 | 10 | 45 | 2.3 | 2.8 | 0.18 | 3.6 | 0.17 | 1 | 2 |
| Example 10-2 | ABS1 | 100 | Example 2-1 | 1 | 48 | 2.5 | 4.8 | 0.24 | 4.4 | 0.22 | 3 | 3 |
| Example 10-3 | ABS1 | 100 | Example 2-1 | 15 | 43 | 2.1 | 1.6 | 0.15 | 2.5 | 0.14 | 1 | 1 |
| Example 10-4 | ABS1 | 100 | Example 2-2 | 10 | 45 | 2.3 | 2.4 | 0.17 | 3.3 | 0.17 | 1 | 2 |
| Example 10-5 | ABS1 | 100 | Example 2-3 | 10 | 46 | 2.3 | 2.6 | 0.18 | 33 | 0.18 | 2 | 2 |
| Example 10-6 | ABS1 | 100 | Example 2-4 | 10 | 45 | 2.2 | 2.8 | 0.18 | 3.4 | 0.18 | 1 | 2 |
| Example 10-7 | ABS1 | 100 | Example 2-5 | 10 | 45 | 2.2 | 2.7 | 0.18 | 3.1 | 0.17 | 2 | 2 |
| Example 10-8 | ABS1 | 100 | Example 2-6 | 10 | 45 | 2.3 | 3.1 | 0.17 | 3.7 | 0.18 | 2 | 2 |
| Example 10-9 | ABS1 | 100 | Example 2-7 | 10 | 46 | 2.3 | 3.0 | 0.18 | 3.2 | 0.17 | 1 | 2 |
| Example 10-10 | ABS1 | 100 | Example 2-8 | 10 | 46 | 2.3 | 3.4 | 0.19 | 3.9 | 0.19 | 2 | 3 |
| Example 10-11 | ABS1 | 100 | Example 2-9 | 10 | 46 | 2.3 | 3.3 | 0.19 | 3.8 | 0.19 | 2 | 3 |
| Example 10-12 | ABS1 | 100 | Example 2-10 | 10 | 44 | 2.2 | 3.4 | 0.19 | 4.1 | 0.20 | 2 | 3 |
| Example 10-13 | ABS1 | 100 | Example 2-11 | 10 | 44 | 2.2 | 3.7 | 0.22 | 3.9 | 0.19 | 2 | 2 |
| Example 10-14 | ABS1 | 100 | Example 2-12 | 10 | 44 | 2.2 | 3.8 | 0.23 | 4.2 | 0.20 | 2 | 3 |
| Example 10-15 | ABS1 | 100 | Example 2-13 | 10 | 45 | 2.3 | 3.1 | 0.20 | 4.1 | 0.20 | 3 | 3 |
| Comparative Example 10-1 | ABS1 | 100 | — | — | 49 | 2.5 | 18.2 | 0.33 | 22.4 | 0.39 | 9 | 10 |
| Comparative Example 10-2 | ABS1 | 100 | Example 2-1 | 30 | 35 | 1.6 | 2.7 | 0.17 | 4.7 | 0.27 | 4 | 6 |
| Comparative Example 10-3 | ABS1 | 100 | Comparative example 2-1 | 10 | 43 | 2.2 | 7.6 | 0.20 | 6.8 | 0.19 | 2 | 2 |
| Comparative Example 10-4 | ABS1 | 100 | Comparative example 2-2 | 10 | 38 | 1.9 | 9.5 | 0.29 | 7.3 | 0.26 | 3 | 3 |
| Comparative Example 10-5 | ABS1 | 100 | Comparative example 2-3 | 10 | 37 | 1.8 | 3.5 | 0.28 | 5.5 | 0.24 | 2 | 3 |
| Comparative Example 10-6 | ABS1 | 100 | Comparative example 2-4 | 10 | 45 | 2.3 | 3.9 | 0.20 | 4.8 | 0.22 | 2 | 6 |
| Target value | | | | | 40 or more | 2.0 or more | 5.0 or less | 0.25 or less | 5.0 or less | 0.25 or less | 3 or less | 3 or less |

Furthermore, the wear amount and the dynamic friction coefficient in the case where the mate material was the (2) neat ABS1 resin exceeded the respective target values.

In the comparative example 10-5, the tensile strength and the flexural modulus didn't satisfy the respective target values. Further, the dynamic friction coefficient in the case where the mate material was the (1) carbon steel (S45C) exceeded the target value. Furthermore, the wear amount in the case where the mate material was the (2) neat ABS1 resin exceeded the target value.

In the comparative example 10-6, the squeaking sound risk value in the case where the mate material was the (2) neat ABS1 resin exceeded the target value.

<PC/ABS Resin Composition>

In the example 11, a PC/ABS resin was used as the (X) thermoplastic resin according to the present invention to manufacture a PC/ABS resin composition.

[Manufacturing of PC/ABS Resin Composition]

In examples 11-1 to 11-17 and comparative examples 11-1 to 11-6, a predetermined amount of the (Y) graft copolymer was appropriately dry-blended in the (x-1) PC resin ("Tarflon A2200" (trade name), standard grade, manufactured by Idemitsu Kosan Co., Ltd., shown as "PC2" in Table 12) and the (x-2) ABS resin ("Stylac 321" (trade name), standard grade, manufactured by Asahi Kasei Chemicals Corporation, shown as "ABS2" in Table 12) with the mixing ratio shown in Table 12, they were melt-kneaded by a twin-screw extruder set to be 240° C., and thus, a PC/ABS resin composition was obtained.

Note that in the examples 11-1 to 11-15, the mixing ratio between the PC resin and the ABS resin in the (X) PC/ABS resin was 70 parts by weight to 30 parts by weight. In the examples 11-1 to 11-15, the (Y) graft copolymers obtained in the examples 2-1 to 2-13 were used. In the examples 11 to 16, the mixing ratio between the PC resin and the ABS resin in the (X) PC/ABS resin was 90 parts by weight to 10 parts by weight. In the example 11-17, the mixing ratio between the PC resin and the ABS resin in the (X) PC/ABS resin was 60 parts by weight to 40 parts by weight. In the examples 11-16 and 11-17, the (Y) graft copolymer obtained in the example 2-1 was used.

The PC/ABS resin composition according to the comparative example 11-1 was manufactured only with the (X) PC/ABS resin, and the (Y) graft copolymer was not used. In the comparative example 11-2, the content of the (Y) graft copolymer obtained in the example 2-1 was 30 parts by weight (relative to 100 parts by weight of (X)). In the comparative example 11-3 to 11-6, the (Y) graft copolymers obtained in the comparative examples 2-1 to 2-4 were used.

In examples 12-1 to 12-6 and comparative example 12-1, a predetermined amount of the (Y) graft copolymer was appropriately dry-blended in the commercially available (X) PC/ABS resin ("Bayblend T65XF" (trade name) manufactured by Bayer, shown as "PC/ABS" in Table 13) with the mixing ratio shown in Table 13, they were melt-kneaded by a twin-screw extruder set to be 240° C., and thus, a PC/ABS resin composition was obtained.

[Manufacturing of Evaluation Material]

In the examples 11-1 to 11-17 and 12-1 to 12-6 and the comparative examples 11-1 to 11-6 and 12-1, the method of manufacturing the evaluation material is similar to that in the examples 3-1 to 3-15 and the comparative examples 3-1 to 3-5 except that the barrel temperature was 245° C. and the mold temperature was 80° C.

[Evaluation Method]

In the examples 11-1 to 11-17 and 12-1 to 12-6 and the comparative examples 11-1 to 11-6 and 12-1, the sliding property evaluation 2 was not performed and only the sliding property evaluation 1 was performed in the evaluation method.

The test conditions of the sliding property evaluation 1 in the case where the mate material was the (1) carbon steel (S45C) were a load: 50 N and a linear speed of 10 cm/sec. The test conditions of the sliding property evaluation 1 in the case where the mate material was the same material as the (2) evaluation material were a load: 20 N and a linear speed: 10 cm/sec.

Further, the other conditions other than the test conditions (a load and linear speed) were similar to those in the example 3.

[Evaluation Results]

The evaluation results of the evaluation materials according to the examples 11-1 to 11-17 and 12-1 to 12-6 and the comparative examples 11-1 to 11-6 and 12-1 are shown in Table 11 and Table 12. The target values of each evaluation were appropriately changed depending on the kind of the (X) thermoplastic resin, and were as shown in Table 11 and Table 12.

TABLE 12

| | (X) Thermoplastic resin | | | | (Y) Graft copolymer | | Mechanical properties | | Evaluation of sliding properties | | | | Squeaking sound risk value | |
| | | | | | | | | | (1) Against S45C | | (2) Against same material | | | |
| | (x-1) PC | | (x-2) ABS | | | | | | Dynamic | | Dynamic | | | (2) |
| | Kind | Parts by weight | Kind | Parts by weight | Kind | Parts by weight | Tensile strength (MPa) | Flexural modulus (GPa) | Wear amount (mg) | friction co-efficient | Wear amount (mg) | friction co-efficient | (1) Against S45C | Against same material |
|---|---|---|---|---|---|---|---|---|---|---|---|---|---|---|
| Example 11-1 | PC2 | 70 | ABS2 | 30 | Example 2-1 | 10 | 44 | 1.8 | 1.0 | 0.19 | 2.0 | 0.17 | 1 | 1 |
| Example 11-2 | PC2 | 70 | ABS2 | 30 | Example 2-1 | 1 | 51 | 2.1 | 2.0 | 0.23 | 4.8 | 0.22 | 3 | 3 |
| Example 11-3 | PC2 | 70 | ABS2 | 30 | Example 2-1 | 3 | 50 | 2.0 | 1.6 | 0.21 | 4.0 | 0.20 | 2 | 2 |
| Example 11-4 | PC2 | 70 | ABS2 | 30 | Example 2-2 | 10 | 44 | 1.8 | 0.8 | 0.18 | 2.1 | 0.18 | 1 | 1 |
| Example 11-5 | PC2 | 70 | ABS2 | 30 | Example 2-3 | 10 | 43 | 1.9 | 0.9 | 0.19 | 2.1 | 0.18 | 1 | 1 |
| Example 11-6 | PC2 | 70 | ABS2 | 30 | Example 2-4 | 10 | 44 | 1.8 | 1.0 | 0.18 | 2.0 | 0.18 | 2 | 2 |

TABLE 12-continued

| | (X) Thermoplastic resin | | | | (Y) Graft copolymer | | Mechanical properties | | Evaluation of sliding properties | | | | Squeaking sound risk value | |
| | (x-1) PC | | (x-2) ABS | | | | | | (1) Against S45C | | (2) Against same material | | | (2) |
| | | | | | | | | | | Dynamic | | Dynamic | (1) | Against |
| | Kind | Parts by weight | Kind | Parts by weight | Kind | Parts by weight | Tensile strength (MPa) | Flexural modulus (GPa) | Wear amount (mg) | friction co-efficient | Wear amount (mg) | friction co-efficient | Against S45C | same material |
|---|---|---|---|---|---|---|---|---|---|---|---|---|---|---|
| Example 11-7 | PC2 | 70 | ABS2 | 30 | Example 2-5 | 10 | 43 | 1.8 | 0.9 | 0.18 | 1.9 | 0.17 | 1 | 2 |
| Example 11-8 | PC2 | 70 | ABS2 | 30 | Example 2-6 | 10 | 45 | 1.9 | 1.1 | 0.21 | 2.2 | 0.18 | 2 | 2 |
| Example 11-9 | PC2 | 70 | ABS2 | 30 | Example 2-7 | 10 | 44 | 1.8 | 0.9 | 0.18 | 1.8 | 0.16 | 1 | 2 |
| Example 11-10 | PC2 | 70 | ABS2 | 30 | Example 2-8 | 10 | 42 | 1.7 | 1.4 | 0.22 | 3.0 | 0.19 | 2 | 2 |
| Example 11-11 | PC2 | 70 | ABS2 | 30 | Example 2-9 | 10 | 42 | 1.7 | 1.6 | 0.22 | 2.9 | 0.20 | 2 | 3 |
| Example 11-12 | PC2 | 70 | ABS2 | 30 | Example 2-10 | 10 | 42 | 1.7 | 1.5 | 0.23 | 2.9 | 0.19 | 2 | 3 |
| Example 11-13 | PC2 | 70 | ABS2 | 30 | Example 2-11 | 10 | 44 | 1.7 | 1.3 | 0.23 | 3.1 | 0.19 | 2 | 3 |
| Example 11-14 | PC2 | 70 | ABS2 | 30 | Example 2-12 | 10 | 43 | 1.8 | 1.4 | 0.22 | 3.2 | 0.19 | 2 | 3 |
| Example 11-15 | PC2 | 70 | ABS2 | 30 | Example 2-13 | 10 | 44 | 1.8 | 1.4 | 0.22 | 2.9 | 0.20 | 1 | 2 |
| Example 11-16 | PC2 | 90 | ABS2 | 10 | Example 2-1 | 10 | 52 | 2.0 | 1.4 | 0.20 | 2.6 | 0.16 | 2 | 3 |
| Example 11-17 | PC2 | 60 | ABS2 | 40 | Example 2-1 | 10 | 40 | 1.7 | 1.9 | 0.23 | 3.8 | 0.19 | 3 | 3 |
| Comparative example 11-1 | PC2 | 70 | ABS2 | 30 | — | — | 52 | 2.2 | 4.9 | 0.28 | 48.1 | 0.32 | 8 | 10 |
| Comparative example 11-2 | PC2 | 70 | ABS2 | 30 | Example 2-1 | 30 | 35 | 1.3 | 1.3 | 0.22 | 4.9 | 0.24 | 2 | 2 |
| Comparative example 11-3 | PC2 | 70 | ABS2 | 30 | Comparative example 2-1 | 10 | 43 | 1.6 | 2.4 | 0.20 | 6.0 | 0.20 | 2 | 2 |
| Comparative example 11-4 | PC2 | 70 | ABS2 | 30 | Comparative example 2-2 | 10 | 42 | 1.6 | 2.6 | 0.24 | 8.1 | 0.26 | 3 | 1 |
| Comparative example 11-5 | PC2 | 70 | ABS2 | 30 | Comparative example 2-3 | 10 | 42 | 1.3 | 1.7 | 0.22 | 2.3 | 0.21 | 3 | 5 |
| Comparative example 11-6 | PC2 | 70 | ABS2 | 30 | Comparative example 2-4 | 10 | 44 | 1.7 | 1.5 | 0.20 | 5.8 | 0.19 | 2 | 3 |
| Target value | | | | | | | 40 or more | 1.5 or more | 2.0 or less | 0.25 or less | 5.0 or less | 0.25 or less | 3 or less | 3 or less |

TABLE 13

| | (X) Thermoplastic resin | | (Y) Graft copolymer | | Mechanical properties | | Evaluation of sliding properties | | | | Squeaking sound risk value | |
| | | | | | | | (1) Against S45C | | (2) Against same material | | | (2) |
| | Kind | Parts by weight | Kind | Parts by weight | Tensile strength (IMPa) | Flexural modulus (GPa) | Wear amount (mg) | Dynamic friction coefficient | Wear amount (mg) | Dynamic friction coefficient | (1) Against S45C | Against same material |
|---|---|---|---|---|---|---|---|---|---|---|---|---|
| Example 12-1 | PC/ABS | 100 | Example 2-1 | 10 | 45 | 1.9 | 1.2 | 0.19 | 14 | 0.16 | 1 | 2 |
| Example 12-2 | PC/ABS | 100 | Example 2-1 | 1 | 48 | 2.1 | 1.9 | 0.25 | 4.6 | 0.21 | 3 | 3 |
| Example 12-3 | PC/ABS | 100 | Example 2-1 | 3 | 47 | 2.0 | 1.8 | 0.21 | 3.5 | 0.17 | 2 | 3 |
| Example 12-4 | PC/ABS | 100 | Example 2-6 | 10 | 44 | 1.9 | 1.1 | 0.18 | 1.3 | 0.17 | 1 | 2 |
| Example 12-5 | PC/ABS | 100 | Example 2-7 | 10 | 44 | 1.8 | 1.2 | 0.18 | 1.4 | 0.16 | 1 | 2 |

TABLE 13-continued

| | (X) Thermoplastic resin | | (Y) Graft copolymer | | Mechanical properties | | Evaluation of sliding properties | | | | Squeaking sound risk value | |
|---|---|---|---|---|---|---|---|---|---|---|---|---|
| | | | | | | | (1) Against S45C | | (2) Against same material | | | (2) |
| | Kind | Parts by weight | Kind | Parts by weight | Tensile strength (IMPa) | Flexural modulus (GPa) | Wear amount (mg) | Dynamic friction coefficient | Wear amount (mg) | Dynamic friction coefficient | (1) Against S45C | Against same material |
| Example 12-6 | PC/ABS | 100 | Example 2-11 | 10 | 45 | 1.8 | 1.4 | 0.20 | 2.6 | 0.20 | 2 | 2 |
| Comparative example 12-1 | PC/ABS | 100 | — | — | 50 | 2.2 | 5.8 | 0.28 | 40.5 | 0.33 | 9 | 10 |
| Target value | | | | | 40 or more | 1.5 or more | 2.0 or less | 0.25 or less | 5.0 or less | 0.25 or less | 3 or less | 3 or less |

As is evident from Table 12 and Table 13, the target values for each of mechanical properties, sliding property evaluation, and the squeaking sound risk value were achieved in the examples 11-1 to 11-17 and the examples 12-1 to 12-6.

In contrast, in the comparative example 11-1, the wear amount and the dynamic friction coefficient in any of the case where the mate material was the (1) carbon steel (S45C) and the case where the mate material was the same material as the (2) evaluation material significantly exceeded the respective target values. Further, the squeaking sound risk value in any of the case where the mate material was the (1) carbon steel (S45C) and the case where the mate material was the same material as the (2) evaluation material exceeded the target value.

In the comparative example 11-2, the tensile strength and the flexural modulus didn't satisfy the respective target values.

In the comparative example 11-3, the wear amount in any of the case where the mate material was the (1) carbon steel (S45C) and the case where the mate material was the (2) evaluation material exceeded the target value.

In the comparative example 11-4, the wear amount in the case where the mate material was the (1) carbon steel (S45C) exceeded the target value. Further, the wear amount and the dynamic friction coefficient in the case where the mate material was the same material as the (2) evaluation material exceeded the respective target values. Furthermore, the squeaking sound risk value in the case where the mate material was the same material as the (2) evaluation material exceeded the target value.

In the comparative example 11-5, the flexural modulus didn't satisfy the target value. Further, the squeaking sound risk value in the case where the mate material was the same material as the (2) evaluation material exceeded the target value.

In the comparative example 11-6, the wear amount in the case where the mate material was the same material as the (2) evaluation material exceeded the target value.

In the comparative example 12-1, the wear amount and the dynamic friction coefficient in the case where the mate material was the (1) carbon steel (S45C) significantly exceeded the respective target values. Further, also the wear amount and the dynamic friction coefficient in the case where the mate material was the same material as the (2) evaluation material significantly exceeded the respective target values. Further, the squeaking sound risk value in any of the case where the mate material was the (1) carbon steel (S45C) and the case where the mate material was the same material as the (2) evaluation material exceeded the target value.

Although embodiments of the present invention have been described, the embodiments of the present invention are not limited to the above-mentioned embodiments and it goes without saying that various modifications can be made without departing from the essence of the present invention.

The invention claimed is:

1. An ethylene-vinyl acetate copolymer resin composition, comprising:
   an (A) ethylene-vinyl acetate copolymer;
   a (B) vinyl copolymer; and
   an (C) organic peroxide as a crosslinking agent capable of crosslinking the (A) ethylene-vinyl acetate copolymer, wherein
   the (B) vinyl copolymer and the (C) organic peroxide are impregnated in the (A) ethylene-vinyl acetate copolymer,
   the (A) ethylene-vinyl acetate copolymer includes 1 to 20 wt % of a vinyl acetate,
   the (B) vinyl copolymer is formed of a (b-1) styrene, (b-2) at least one of acrylonitrile and glycidyl methacrylate, a (b-3) t-butylperoxymethacryloyloxyethyl carbonate, and a (b-4) polymerization initiator,
   a content of the (C) organic peroxide is 0.1 to 3 parts by weight relative to 100 parts by weight of the (A) ethylene-vinyl acetate copolymer,
   a 10 hour half-life period temperature of the (b-4) polymerization initiator is 50 to 75° C., and
   a 10 hour half-life period temperature of the (C) organic peroxide is 95 to 130° C.

2. The ethylene-vinyl acetate copolymer resin composition according to claim 1, wherein
   a content of the (A) ethylene-vinyl acetate copolymer is 50 to 90 parts by weight relative to 100 parts by weight of the (A) ethylene-vinyl acetate copolymer, the (b-1) styrene, and the (b-2) at least one of acrylonitrile and glycidyl methacrylate.

3. A graft copolymer obtained by melt-kneading the ethylene-vinyl acetate copolymer resin composition according to claim 1, comprising:
   a main chain formed of the (A) ethylene-vinyl acetate copolymer; and
   a side chain formed of a vinyl copolymer including the (b-1) styrene and the (b-2) at least one of acrylonitrile and glycidyl methacrylate.

4. A thermoplastic resin composition, comprising:
   a (X) thermoplastic resin; and
   the (Y) graft copolymer according to claim 3, wherein
   a content of the (Y) graft copolymer according to claim 3 is 1 to 25 parts by weight relative to 100 parts by weight of the (X) thermoplastic resin.

5. The thermoplastic resin composition according to claim 4, wherein
the (X) thermoplastic resin is a thermoplastic resin mixed with one or two or more kinds of resin selected from a polyacetal resin, a polyamide resin, a polycarbonate resin, and an ABS resin.

6. The thermoplastic resin composition according to claim 4, further comprising
one or more kinds of lubricant selected from a fatty acid ester, a fatty acid amide, a polyethylene wax, and a paraffin wax as a (Z-1) lubricant, wherein
a content of the (Z-1) lubricant is 1 to 5 parts by weight relative to 100 parts by weight of the (X) thermoplastic resin.

7. The thermoplastic resin composition according to claim 4, further comprising
one or more kinds of filler selected from calcium carbonate and potassium titanate as a (Z-2) inorganic filler, wherein
a content of the (Z-2) inorganic filler is 3 to 8 parts by weight relative to 100 parts by weight of the (X) thermoplastic resin.

8. A molded resin article obtained by molding the thermoplastic resin composition according to claim 4.

* * * * *